(12) United States Patent
Harwood et al.

(10) Patent No.: US 11,728,979 B2
(45) Date of Patent: Aug. 15, 2023

(54) METHOD AND SYSTEM FOR PERFORMING TELEMETRY SERVICES FOR COMPOSED INFORMATION HANDLING SYSTEMS

(71) Applicant: Dell Products L.P., Round Rock, TX (US)

(72) Inventors: John S. Harwood, Boston, MA (US); Elie Antoun Jreij, Pflugerville, TX (US); Susan Elizabeth Young, North Scituate, RI (US); Edward Henry, Jurupa Valley, CA (US); Robert Anthony Lincourt, Jr., Franklin, MA (US); Gaurav Chawla, Austin, TX (US); Douglas L. Farley, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/569,127

(22) Filed: Jan. 5, 2022

(65) Prior Publication Data
US 2023/0216666 A1    Jul. 6, 2023

(51) Int. Cl.
*H04L 9/08* (2006.01)
(52) U.S. Cl.
CPC ................... *H04L 9/0833* (2013.01)
(58) Field of Classification Search
CPC .................................................. H04L 9/0833
See application file for complete search history.

(56) References Cited

U.S. PATENT DOCUMENTS

| | | | |
|---|---|---|---|
| 8,949,978 B1* | 2/2015 | Lin | ........................ G06F 21/51 726/25 |
| 8,966,582 B1* | 2/2015 | Ainslie | ................... H04L 63/14 726/22 |
| 9,191,392 B2* | 11/2015 | Niemela | ............. H04L 63/1441 |

(Continued)

FOREIGN PATENT DOCUMENTS

WO    2017210142 A1    12/2017

OTHER PUBLICATIONS

Anonymous: "In-situ processing—Wikipedia", Oct. 23, 2021 (Oct. 23, 2021), pp. 1-4, XP093027589, Retrieved from the Internet: URL: https://en.wikipedia.org/w/index.php?title=In-situ_processingoldid=1051487646 [retrieved on Feb. 28, 2023] (4 pages).

(Continued)

*Primary Examiner* — Viral S Lakhia
(74) *Attorney, Agent, or Firm* — Chamberlain, Hrdlicka, White, Williams & Aughtry

(57) ABSTRACT

Techniques described herein relate to a method for performing telemetry services for composed information handling systems. The method includes obtaining, by a system control processor manager, a telemetry request associated with a composed information handling system from a user associated with a group; in response to obtaining the telemetry request: identifying a telemetry intent associated with the telemetry request; aggregating telemetry data based on the telemetry intent to obtain aggregated telemetry data; encrypting the aggregated telemetry data based on telemetry distribution information associated with the group to obtain encrypted aggregated telemetry data; and providing the encrypted aggregated telemetry data to the group.

18 Claims, 10 Drawing Sheets

(56) References Cited

U.S. PATENT DOCUMENTS

| | | | |
|---|---|---|---|
| 9,686,287 B2* | 6/2017 | Manton | G06F 21/335 |
| 10,707,950 B2* | 7/2020 | Martinerie | B64C 39/024 |
| 11,049,349 B2* | 6/2021 | Onischuk | G07C 13/00 |
| 11,113,721 B2* | 9/2021 | George | G06Q 30/016 |
| 11,140,170 B2* | 10/2021 | Barouch | H04L 67/60 |
| 11,182,810 B1* | 11/2021 | Pandey | G06Q 30/0241 |
| 11,232,369 B1* | 1/2022 | Li | G06Q 50/01 |
| 11,320,541 B1* | 5/2022 | Cattaneo | H04W 12/30 |
| 11,444,955 B2* | 9/2022 | Bhandari | H04L 63/0428 |
| 11,522,776 B1* | 12/2022 | Pai | H04L 43/0811 |
| 11,528,300 B2* | 12/2022 | Degioanni | G06F 21/52 |
| 11,539,817 B1 | 12/2022 | Perez | |
| 11,558,413 B2* | 1/2023 | Higgins | H04L 63/0428 |
| 11,561,916 B2* | 1/2023 | Kamath | H04L 63/0428 |
| 2004/0230764 A1 | 11/2004 | Merchant et al. | |
| 2011/0078242 A1* | 3/2011 | Davi | G06F 16/958 709/204 |
| 2014/0317224 A1 | 10/2014 | Resch et al. | |
| 2015/0327068 A1* | 11/2015 | Hunt | H04L 67/104 726/4 |
| 2016/0005029 A1* | 1/2016 | Ivey | G06Q 20/409 705/44 |
| 2016/0105512 A1 | 4/2016 | Richter et al. | |
| 2016/0359872 A1 | 12/2016 | Yadav et al. | |
| 2017/0031761 A1* | 2/2017 | Horan | G06F 11/3034 |
| 2017/0093700 A1* | 3/2017 | Gilley | H04L 69/08 |
| 2017/0279690 A1 | 9/2017 | Tripathi et al. | |
| 2018/0262407 A1* | 9/2018 | Biswas | H04L 43/0876 |
| 2018/0276632 A1 | 9/2018 | Gandevia et al. | |
| 2018/0285951 A1 | 10/2018 | Borovikov et al. | |
| 2019/0065256 A1 | 2/2019 | Hamilton et al. | |
| 2019/0281132 A1 | 9/2019 | Sethuraman et al. | |
| 2020/0027093 A1* | 1/2020 | Volk | G06F 21/44 |
| 2020/0082112 A1* | 3/2020 | Altshuler | G06F 21/6227 |
| 2020/0141827 A1 | 5/2020 | Lindman | |
| 2020/0201692 A1 | 6/2020 | Kachare et al. | |
| 2020/0250163 A1 | 8/2020 | Kuimelis et al. | |
| 2020/0348959 A1 | 11/2020 | Krasner et al. | |
| 2021/0209600 A1* | 7/2021 | Fontana | G06Q 40/02 |
| 2022/0070193 A1* | 3/2022 | Konda | G06N 3/08 |
| 2022/0283974 A1 | 9/2022 | Long | |

OTHER PUBLICATIONS

International Search Report and Written Opinion dated Apr. 11, 2023, issued in corresponding PCT Application No. PCT/US2022/053142 (11 pages).

International Search Report and Written Opinion dated Apr. 12, 2023, issued in corresponding PCT Application No. PCT/US2022/053170 (13 pages).

International Search Report and Written Opinion dated Apr. 18, 2023, issued in corresponding PCT Application No. PCT/US2022/053169 (10 pages).

International Search Report and Written Opinion dated Mar. 9, 2023, issued in corresponding PCT Application No. PCT/US2022/053157 (14 pages).

Shaikh Aaysha et al., "Framework for Security of Shared Data in Cloud Environment", 2016 International Conference on Computing Communication Control and Automation (ICCUBEA), IEEE, Aug. 12, 2016, pp. 1-6 (6 pages).

* cited by examiner

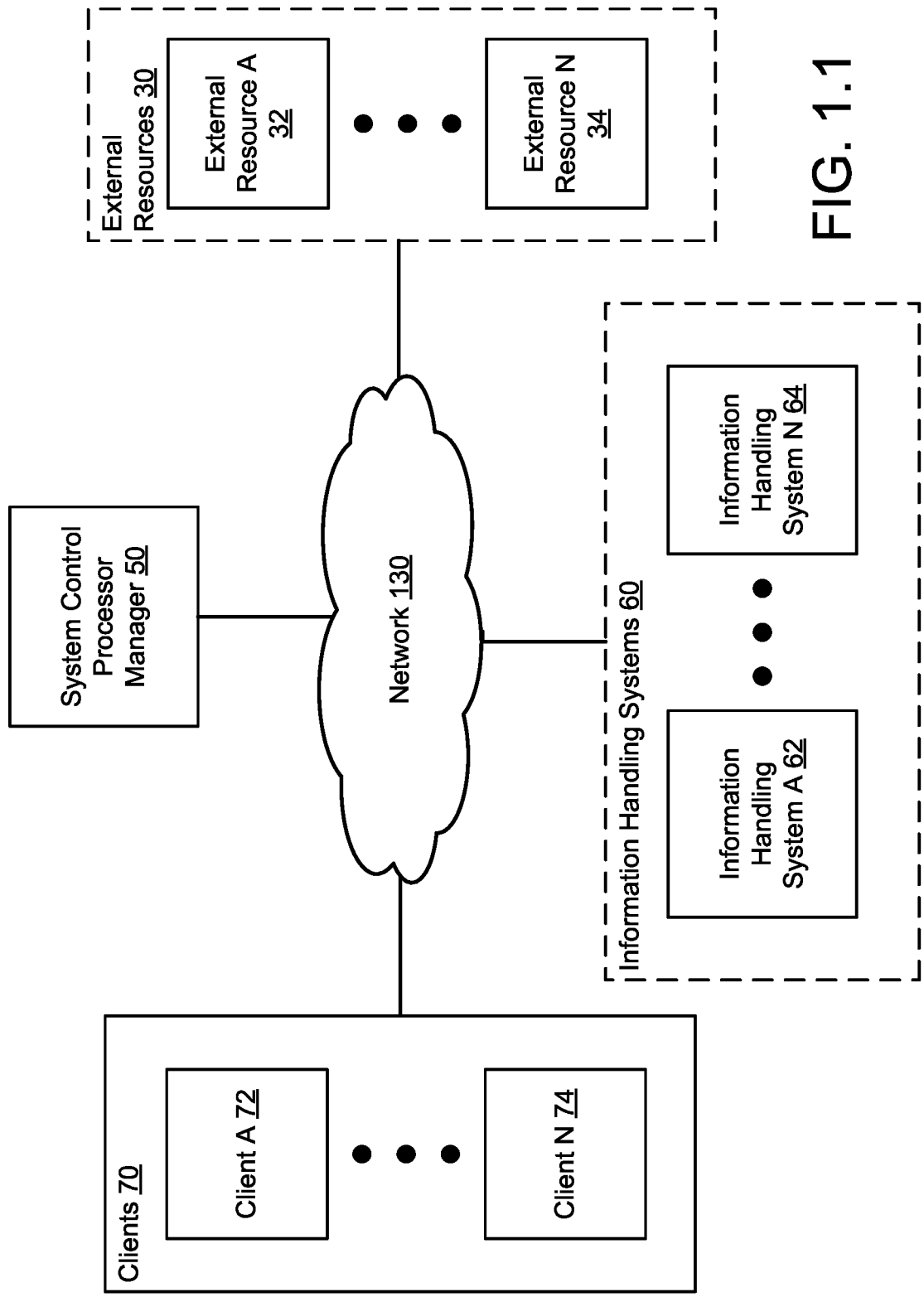
FIG. 1.1

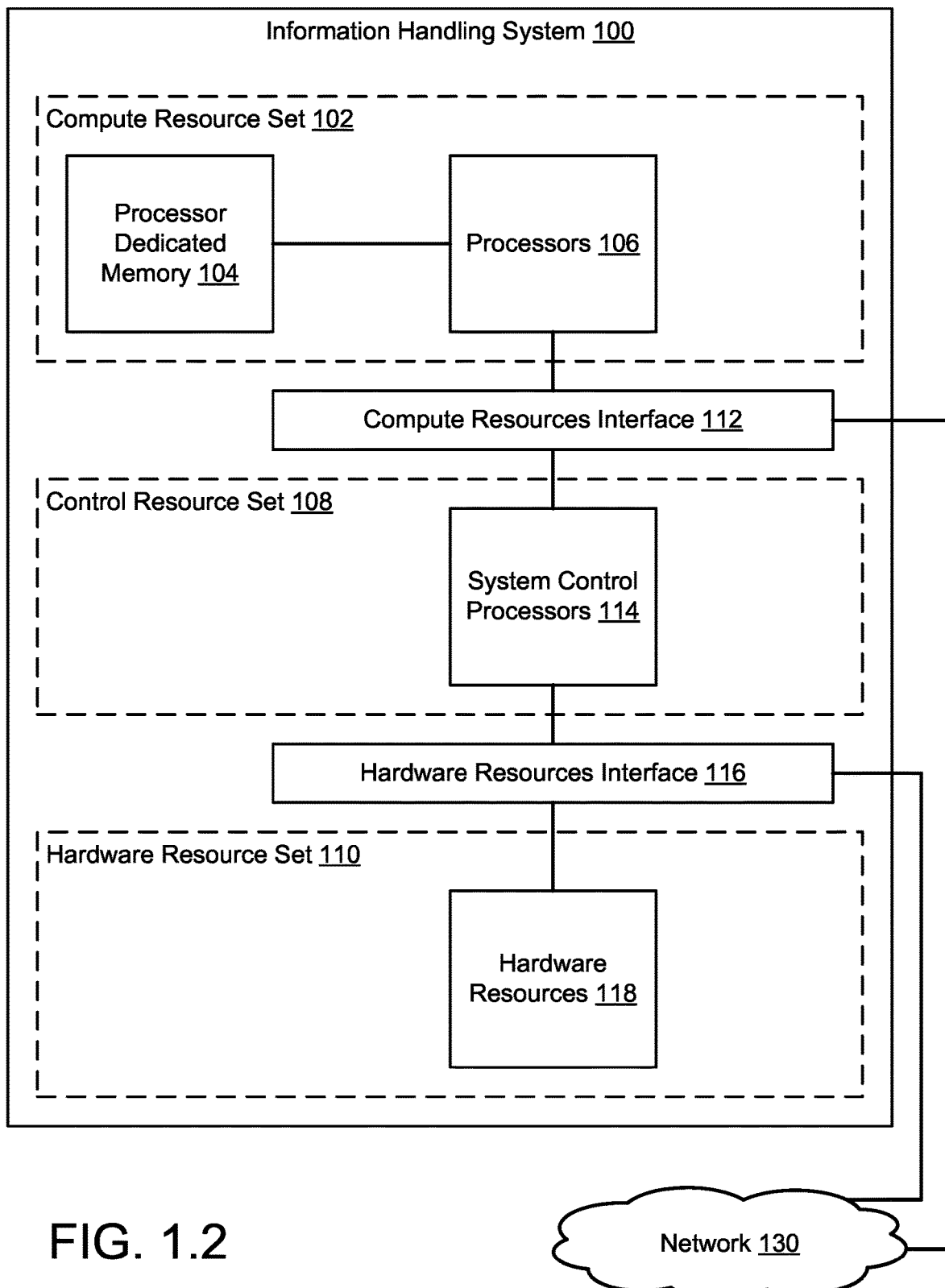
FIG. 1.2

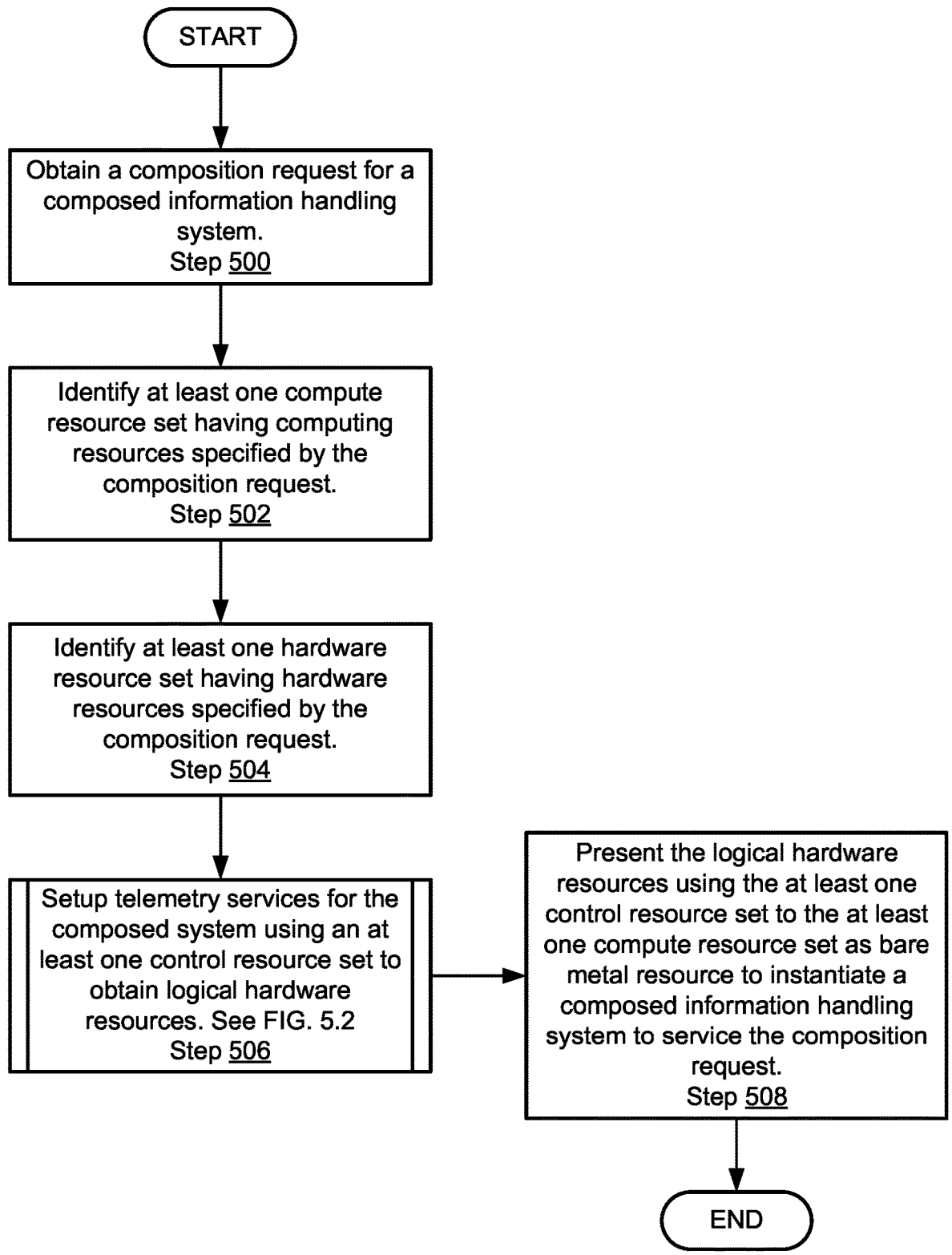
FIG. 5.1

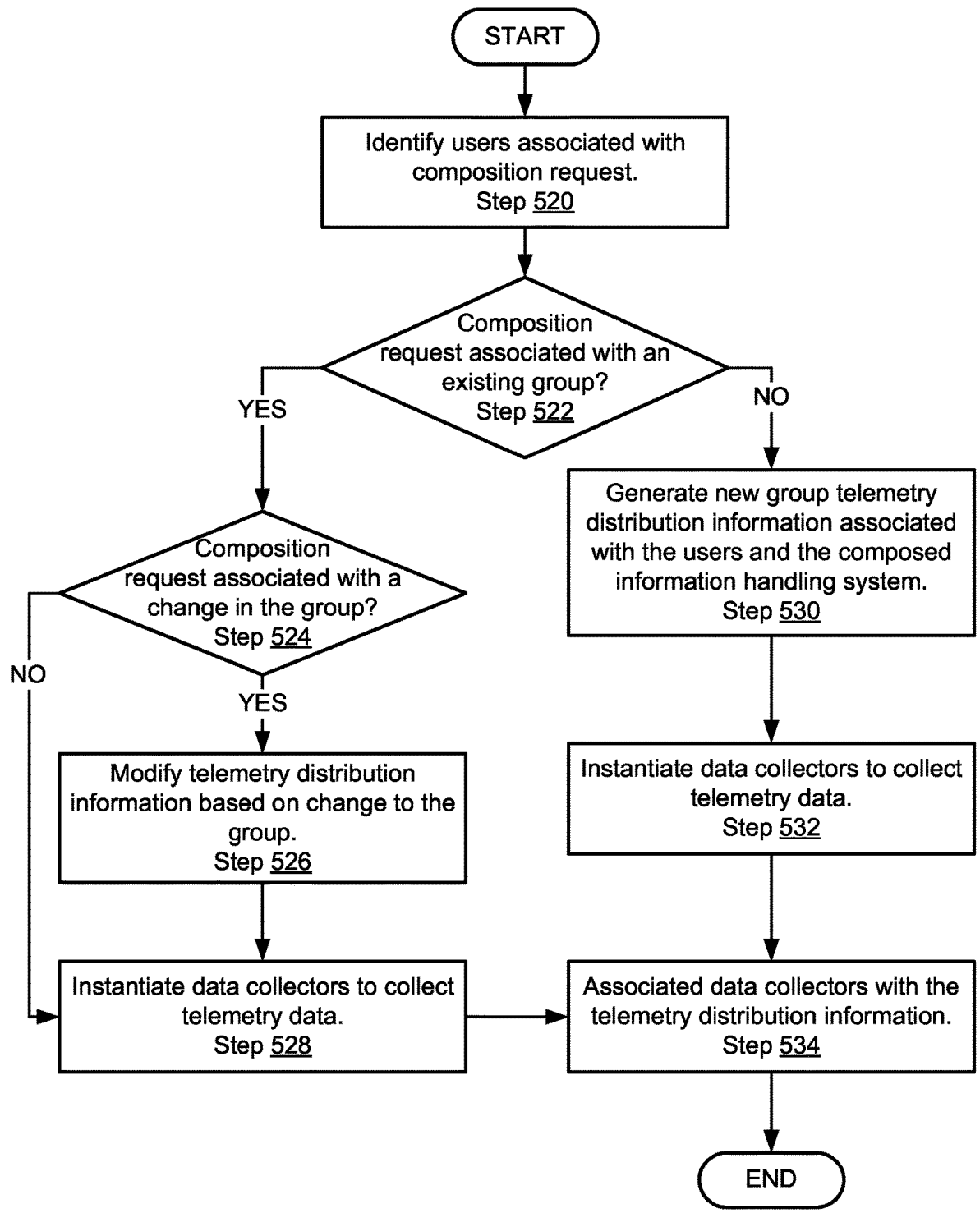
FIG. 5.2

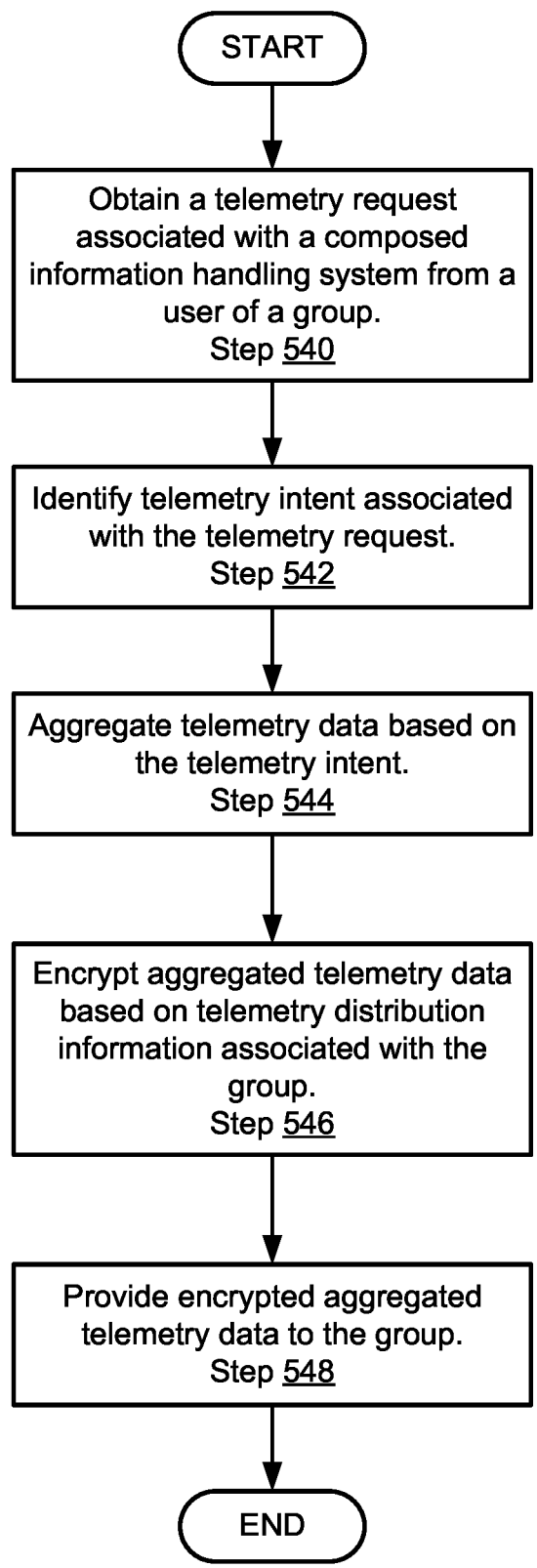
FIG. 5.3

METHOD AND SYSTEM FOR PERFORMING TELEMETRY SERVICES FOR COMPOSED INFORMATION HANDLING SYSTEMS

BACKGROUND

Computing devices may provide services. To provide the services, the computing devices may include hardware components and software components. The services provided by the computing devices may be limited by these components. The hardware components and software components may be allocated to provide the services. User of the hardware components and software components may desire to monitor the performance of services. To monitor the performance of the services, telemetry data associated with the hardware components and the software components may be generated.

SUMMARY

In general, certain embodiments described herein relate to a method for performing telemetry services for composed information handling systems. The method may include obtaining, by a system control processor manager, a telemetry request associated with a composed information handling system from a user associated with a group; in response to obtaining the telemetry request: identifying a telemetry intent associated with the telemetry request; aggregating telemetry data based on the telemetry intent to obtain aggregated telemetry data; encrypting the aggregated telemetry data based on telemetry distribution information associated with the group to obtain encrypted aggregated telemetry data; and providing the encrypted aggregated telemetry data to the group.

In general, certain embodiments described herein relate to a system for performing telemetry services for composed information handling systems. The system includes a one or more composed information handling systems, wherein the plurality of composed information handling systems includes one or more system control processors; and a system control processor manager, which includes a processor and memory, is programmed to: obtain a telemetry request associated with a composed information handling system from a user associated with a group; in response to obtaining the telemetry request: identify a telemetry intent associated with the telemetry request; aggregate telemetry data based on the telemetry intent to obtain aggregated telemetry data; encrypt the aggregated telemetry data based on telemetry distribution information associated with the group to obtain encrypted aggregated telemetry data; and provide the encrypted aggregated telemetry data to the group.

In general, certain embodiments described herein relate to a non-transitory computer readable medium that includes computer readable program code, which when executed by a computer processor enables the computer processor to perform a method for performing telemetry services for composed information handling systems. The method may include obtaining, by a system control processor manager, a telemetry request associated with a composed information handling system from a user associated with a group; in response to obtaining the telemetry request: identifying a telemetry intent associated with the telemetry request; aggregating telemetry data based on the telemetry intent to obtain aggregated telemetry data; encrypting the aggregated telemetry data based on telemetry distribution information associated with the group to obtain encrypted aggregated telemetry data; and providing the encrypted aggregated telemetry data to the group.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method for instantiating a composed information handling system in accordance with one or more embodiments of the invention.

FIGS. 5.2 shows a flowchart of a method for setting up telemetry services in accordance with one or more embodiments of the invention.

FIG. 5.3 shows a flowchart of a method for performing telemetry services in accordance with one or more embodiments of the invention.

DETAILED DESCRIPTION

Figure 2:
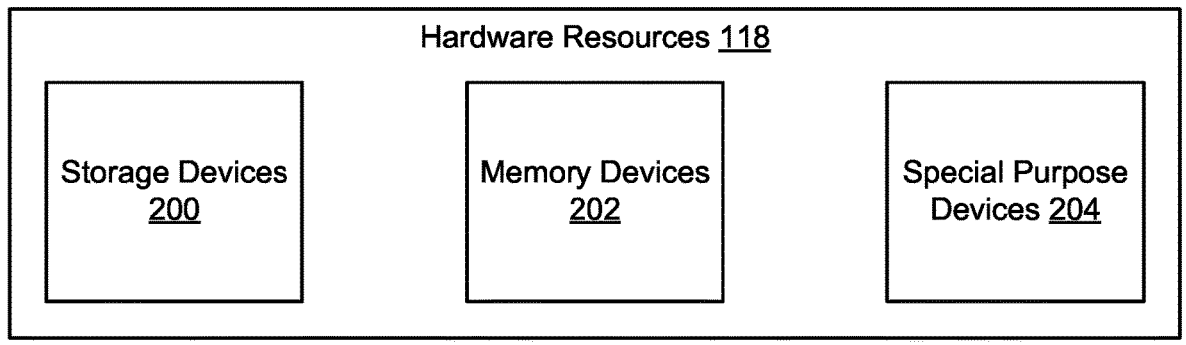
FIG. 2 shows a diagram of hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general embodiments of the invention relate to methods, systems, and non-transitory computer readable mediums for performing telemetry services for composed information handling systems.

In one or more embodiments of the invention, composed information handling system are composed to perform computer implemented services. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services.

To allocate computing resources, the system may include a system control processor manager. The system control processor manager may obtain composition requests. The composition requests may indicate a desired outcome such as, for example, execution of one or more applications, providing of one or more services, etc. The system control processor manager may translate the composition requests into corresponding quantities of computing resources necessary to be allocated to satisfy the intent of the composition requests.

The users of composed information handling systems may desire to evaluate the health and performance of the computing resources of composed information handling systems. Telemetry data may be generated for composed information handling systems satisfy the aforementioned desire to evaluate the health and performance of the computing resources of composed information handling systems. Due to the large scale of composed information handling systems, a massive quantity of telemetry data may be generated for a single composition handling system. In traditional systems, all of the telemetry data may be provided to a user, and the user may have to manually parse the telemetry data to identify a portion of the telemetry data that the user desires to evaluate. This may take a significant amount of the user's time. Additionally, telemetry data of a single composed information handling system may be transmitted to multiple users. Sending the telemetry data to each user individually may result in the inefficient use of resources. Moreover, there may be risks of data security breaches if the unauthorized users gained access to the telemetry data.

To address, at least in part, the aforementioned issues, embodiments of the invention relate to providing telemetry services for composed information handling systems. Specifically, embodiments of the invention may enable users associated with a group to submit composition requests associated with telemetry services, provide a system control processor manager that may compose an compose information handling system to with telemetry service capabilities, and generate telemetry distribution information associated with the group including a group encryption key which may be provided to all users included in the group. As a result, a user of the group may submit a telemetry request to the system control processor manager. The system control processor manager may aggregate telemetry data from data collectors and/or system control processors of the composed information handling system to satisfy the telemetry intent, encrypt the aggregated telemetry data with the group encryption key, and broadcast the encrypted aggregated telemetry data to all users of the group for further processing and analysis of the aggregated telemetry data. Consequently, the efficiency and security of generating and providing telemetry data to users of groups may be improved.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling system of the system of FIG. 1.1 may operate independently and/or cooperatively to provide the computer implemented services. For example, a single information handling system (e.g., 60) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

As discussed above, embodiments of the invention relate to system, methods, and devices for managing the hardware resources of the information handling systems (60) and/or other resources (e.g., external resources (30)) to perform telemetry services for composed information handling systems and the information handling systems (60). The hardware resources of the information handling systems (60) may be managed by instantiating one or more composed information handling systems using the hardware resources of the information handling systems (60), external resources (30), and/or other types of hardware devices operatively connected to the information handling systems (60). During the instantiation of the composed information handling systems, one or more devices, including a system control processor and data collectors, may be automatically setup to perform telemetry services for the composed information handling systems. The telemetry services may be used to collect telemetry data and provide the telemetry data to users.

In one or more embodiments of the invention, the system includes a system control processor manager (50). The system control processor manager (50) may provide composed information handling system composition services.

Composed information handling system composition services may include (i) obtaining composition requests for composed information handling systems and (ii) aggregating computing resources from the information handling systems (60) and/or external resources (30) using system control processors to service the composition requests by instantiating composed information handling systems in accordance with the requests. By doing so, instantiated composed information handling systems may provide computer implemented services in accordance with the composition requests.

In one or more embodiments of the invention, the system control processor manager (50) instantiates composed information handling systems in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model.

By logically dividing the computing resources of an information handling system into these resource sets, different quantities an types of computing resources may be allocated to each composed information handling system thereby enabling the resources allocated to the respective information handling system to match performed workloads. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model. For additional details regarding the system control processor manager (50), refer to FIG. 4.

In one or more embodiments of the invention, a composed information handling system (also referred to herein as a composed system) is a device that is formed using all, or a portion, of the computing resources of the information handling systems (60), the external resources (30), and/or other types of hardware devices operatively connected to the information handling systems (60). The composed information handling system may utilize the computing resources allocated to it to provide computer implemented services. For example, the composed information handling system may host one or more applications that utilize the computing resources assigned to the composed information handling system. The applications may provide the computer implemented services.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may organize the performance of duplicative workloads to improve the likelihood that workloads are completed, and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction, emulation, virtualization, security model, etc. For example, the system control processors of the control resource sets may provide the abstraction, emulation, virtualization, data protection, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems. For additional details regarding the information handling systems (60), refer to FIG. 1.2.

The external resources (30) may be provide computing resources that may be allocated for use by composed information handling systems. For example, the external resources (30) may include hardware devices that provide any number and type of computing resources. The composed information handling system may use these resource to provide their functionalities. Different external resources (e.g., 32, 34) may provide similar or different computing resources.

In one or more embodiments of the invention, the system of FIG. 1.1 includes backup storages (70) that provide data storage services to the composed information handling systems. The backup storages (70) may include any number of backup storages, for example, the backup storages (70) may include backup storage A (72) and backup storage N (74). The data storage services may include storing of data provided by the composed information handling systems and providing previously stored data to the composed information handling systems. The data stored in backup storages (70) may be used for restoration purposes. The data stored in the backup storages (70) may be used for other purposes without departing from the invention. The data stored in backup storages (70) may include backups generated during the performance of data protection services of the composed information handling systems. The backups may be any type of backup (e.g., snapshot, incremental backup, full backup, etc.) without departing from the invention. The data stored in backup storages (70) may include other and/or additional types of data obtained from other and/or additional components without departing from the invention.

The system of FIG. 1.1 may include any number of information handling systems (e.g., 62, 64), any number of external resources (e.g., 32, 34), any number of backup storages (e.g., 72, 74), and any number of system control processor managers (e.g., 50). Any of the components of FIG. 1.1 may be operatively connected to any other component and/or other components not illustrated in FIG. 1.1 via one or more networks (e.g., 130). The networks may be implemented using any combination of wired and/or wireless network topologies.

The system control processor manager (50), information handling systems (60), backup storages (70), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), backup storages (70), and/or external resources (30) described in this application and/or all, or a portion, of the methods illustrated in FIGS. 5.1-5.3. The system control processor manager (50), information handling systems (60), backup storages (70), and/or external resources (30) may be implemented using other types of computing devices without departing from the invention. For additional details regarding computing devices, refer to FIG. 7.

While the system has been illustrated and described as including a limited number of specific components, a system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems and perform telemetry services. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated. Additionally, the control resource set (108) may prepare hardware resource sets (e.g., 110) or other computer resources (e.g., system control processors (114)) to perform all, or a portion of, the telemetry services.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a compute resource set is instructed to instantiate a composed information handling system including a compute resource set and a hardware resource set that will contribute storage resources to the compute resource set. The compute resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources.

The compute resource set (102) may include one or more processors (106) operatively connected to the processor dedicated memory (104). Consequently, the compute resource set (102) may host any number of executing processes thereby enabling any number and type of workloads to be performed. When performing the workloads, the compute resource set (102) may utilize computing resources provided by the hardware resource set (110) of the information handling system (100), hardware resource sets of other information handling systems, and/or external resources.

The processors (106) of the compute resource set (102) may be operatively connected to one or more system control processors (114) of the control resource set (108). For example, the processors (106) may be connected to a compute resource interface (112), which is also connected to the system control processors (114).

The system control processors (114) of the control resource set (108) may present computing resources to the processors (106) as bare metal resources. In other words, from the point of view of the processors (106), any number of bare metal resources may be operatively connected to it via the compute resources interface (112) when, in reality, the system control processors (114) are operatively connected to the processors (106) via the compute resources interface (112). In other words, the system control processors (114) may manage presentation of other types of resources to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106)

and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and manage may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect user of hardware devices and computing resources provided thereby.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operatively connected to it (e.g., the hardware resource set (110), other resources operatively connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operatively connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operatively connected to other hardware resource sets of other information handling systems via hardware resources interface (116), network (130), and/or other system control processors of the other information handling systems. The system control processors (114) may cooperatively enable hardware resource sets of other information handling systems to be prepared and presented as bare metal resources to the compute resource set (102).

In an additional example, the system control processors (114) may be operatively connected to external resources via hardware resources interface (116) and network (130). The system control processors (114) may prepare and present the external resources as bare metal resources to the compute resource set (102).

Figure 3:
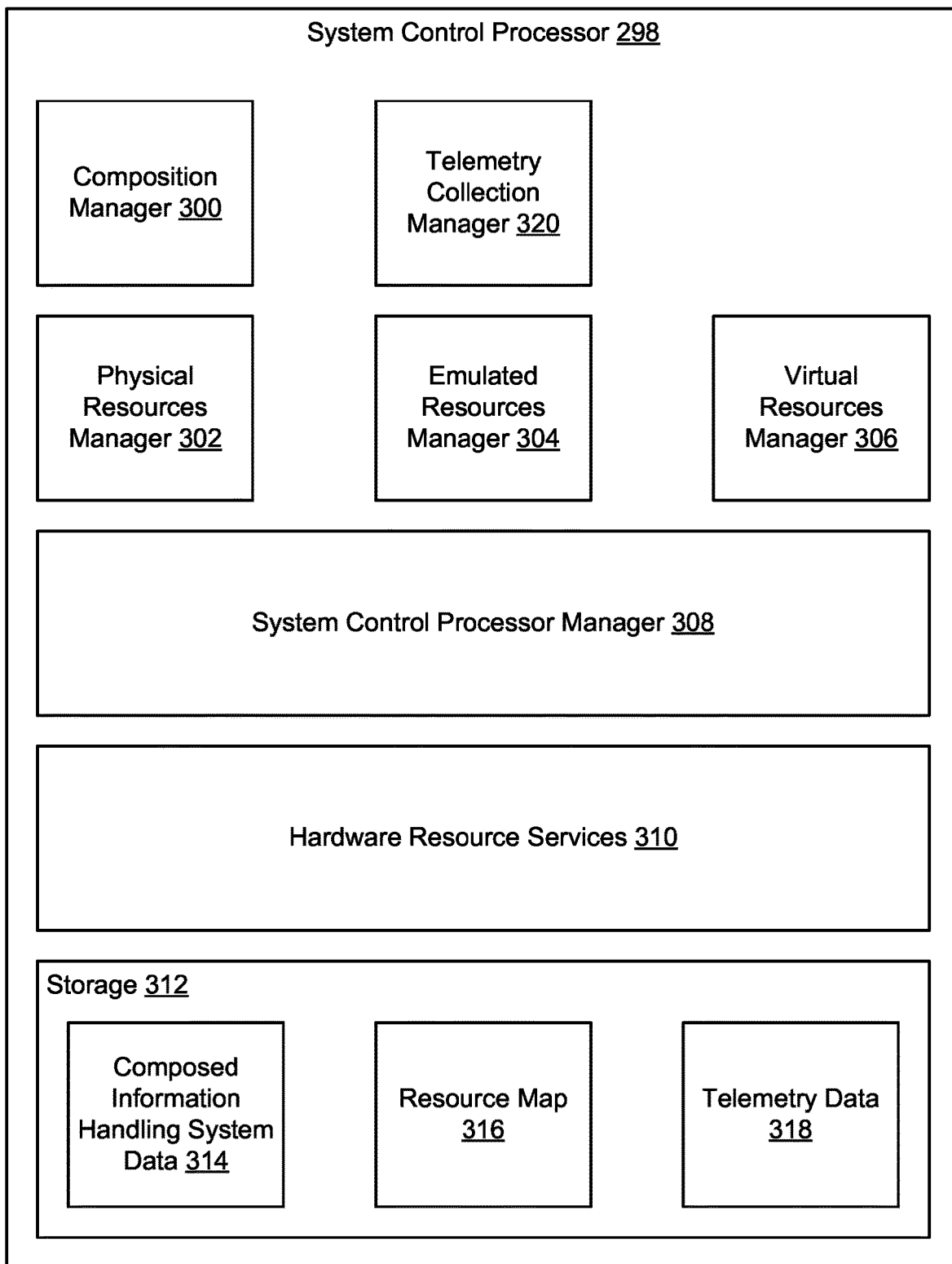
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The hardware resources interface (116) may be implemented using any suitable interconnection technology including, for example, system buses such as compute express links or other interconnection protocols. The hardware resources interface (116) may support any input/output (TO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-ban connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems.

The network (130) may correspond to any type of network and may be operatively connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-5.3. The information handling system (100) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram of the hardware resources (118) in accordance with one or more embodiments of the invention. As noted above, system control processors of information handling system may present resources including, for example, any portion of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The system control processors or other entities may write data chunks to the storage devices (200). The storage devices (200) may include any type and quantity of devices for storing data. The devices may include, for example, hard disk drives, solid state drives, tape drives, etc. The storage devices (200) may include other types of devices for providing storages resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models, telemetry models. The models may include other models such as, for example, security models, workload performance availability models, reporting models, etc. The telemetry models may include generating, obtaining, and/or maintaining telemetry data for composed information handling systems. For additional information regarding the performance of telemetry services, refer to FIGS. 5.2-5.3.

The manner of operation of these devices (i.e., the performance of the aforementioned telemetry services) may be transparent to users utilizing the hardware devices for providing computer implemented services. Consequently, even though and users may be unaware of the implementation of these models, the composed information handling systems may still operate in accordance with these models thereby providing a reliable, efficient, and secure method of performing the telemetry services for composed information handling systems.

While the hardware resources (118) have been illustrated and described as including a limited number of specific components, hardware resources (118) in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation and operation of composed information handling systems. By doing so, a system that includes information handling systems may dynamically instantiate composed information handling systems to provide computer implemented services and to provide local telemetry services for the composed information handling system.

To instantiate and operate composed information handling systems, the system control processor (298) may include a composition manager (300), a physical resources manager (302), an emulated resources manager (304), a virtual resources manager (306), an telemetry collection manager (320), an system control processor manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition requests for composed information handling systems, (iv) based on the composition requests, prepare and present resources as bare metal resources to compute resource sets, (v) instantiate applications in composed information handling systems to cause the composed information handling systems to provide computer implemented services, conform their operation to security models, etc., (vi) add/remove/modify resources presented to the compute resource sets of composed information handling systems dynamically in accordance with workloads being performed by the composed information handling systems, and/or (vii) coordinate with other system control processors to provide distributed system functionalities. By providing the above functionalities, a system control processor in accordance with one or more embodiments of the invention may enable distributed resources from any number of information handling systems to be aggregated into a composed information handling system to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or other information regarding hardware components of the information handling system that may be allocated to form composed information handling systems.

The composition manager (300) may obtain composition requests from other entities (e.g., management entities tasked with instantiating composed information handling systems) as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, data protection services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

Additionally, the system control processors may take into account an importance of completion of workloads when preparing and presenting resources. For example, some workloads that may be performed by various hardware devices may be critical (e.g., high availability workloads) to the computer implemented services to be provided by a composed information handling system. In such a scenario, the system control processor may over allocate resources (e.g., beyond that requested by a compute resource set) for performance of the workloads so that at least two instances of the workloads can be performed using duplicative resources. By doing so, it may be more likely that at least one of the workloads will be completed successfully. Consequently, the system control processor may provide the output of one of the workloads to compute resource sets of a composed information handling system.

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition requests (e.g., present two storage devices to a compute resource set when a single information handling system only includes a single storage device). In this scenario, a second system control processor of a second information handling system operatively connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling system may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these command and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

To provide the aforementioned local telemetry services, the system control processor (298) may include the telemetry collection manager (320). The telemetry collection manager (320) may include the functionality to perform all, or a portion, of the local telemetry services. The local telemetry services may include (i) instantiating data collectors to generate and/or obtain telemetry data, (ii) generating data collector information associated with the data collectors, (iii) storing and/or maintaining telemetry data (e.g., telemetry data (318)) obtained from the data collectors, (iv) obtaining requests for telemetry data to satisfy a telemetry intent from the system control processor manager (e.g., 50, FIG. 1.1), and (v) providing telemetry data to the system control processor manager (e.g., 50, FIG. 1.1) to satisfy telemetry intents. The local telemetry services may include other and/or additional services without departing from the invention. For additional information regarding the telemetry services, refer to FIGS. 5.2-5.3. Other components of the system control processor (298) (e.g., composition manager (300)) may perform all, or a portion, of the local telemetry services without departing from the invention.

The functionalities of the physical resources manager (302), emulated resources manager (304), virtual resources manager (306), and the telemetry collection manager (320) may be utilized in isolation and/or combination to provide bare metal resources to compute resource sets and to provide management services to the composed information handling system. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding IO from compute resource sets to hardware devices), bare metal resource addressing of virtualized resources, and/or as emulated resources compatible with the hardware components of the compute resource set.

The functionality of the physical resources manager (302), emulated resources manager (304), virtual resources manager (306), and the telemetry collection manager (320) may be invoked using any communication model including, for example, message passing, state sharing, memory sharing, etc.

The system control processor manager (308) may manage the general operation of the system control processor (298). For example, the system control processor manager (308) may operate as an operating system or other entity that manages the resources of the system control processor (298). The composition manager (300), physical resources manager (302), emulated resources manager (304), virtual resources manager (306), and the telemetry collection manager (320) and/or other entities hosted by the system control processor (298) may call or otherwise utilize the system control processor manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware devices of hardware resource sets. The hardware resource services (310) may be invoked by, for example, the system control processor manager (308).

When providing their functionalities, any of the aforementioned components of the system control processor (298) may perform all, or a portion, methods illustrated in FIG. 5.1-5.3.

The system control processor (298) may be implemented using computing devices. The computing devices may be, for example, an embedded computing device such a system on a chip, a processing device operatively coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-5.3. The system control processor (298) may be implemented using other types of computing devices without departing from the invention. For additional details regarding computing devices, refer to FIG. 7.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, the composition manager (300), physical resources manager (302), emulated resources manager (304), virtual resources manager (306), telemetry collection manager (320), system control processor manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), physical resources manager (302), emulated resources manager (304), virtual resources manager (306), telemetry collection manager (320), system control processor manager (308), and/or hardware resource services (310). The composition manager (300), physical resources manager (302), emulated resources manager (304), virtual resources manager (306), telemetry collection manager (320), system control processor manager (308), and/or hardware resource services (310) may be implemented using other types of hardware devices without departing from the invention.

In one or more embodiments of the invention, the composition manager (300), physical resources manager (302), emulated resources manager (304), virtual resources manager (306), telemetry collection manager (320), system control processor manager (308), and/or hardware resource services (310) are implemented using a processor adapted to execute computing code stored on a persistent storage (e.g., as part of the system control processor (298) or operatively connected to the system control processor (298) thereby enabling processors of the system control processor (298) to obtain and execute the computing code) that when executed by the processor performs the functionality of the composition manager (300), physical resources manager (302), emulated resources manager (304), virtual resources manager (306), telemetry collection manager (320), system control processor manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314), a resource map (316) and telemetry data (318). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

The telemetry data (318) may be implemented using one or more data structures that includes information generated and/or obtained by data collectors (not shown) during the performance of telemetry services. Data collectors may refer to applications, services, and/or devices that may include the functionality to generate and/or obtain telemetry data associated with composed information handling system components. Each data collector may be associated with one or more composed information handling system components. The data collectors may be implemented as computer instructions, which when executed by a system control processor (e.g., 298) or other processor of the composed information handling system, cause the system control processor or the other processor to provide the functionality of the data collectors described herein. The data collectors may include other and/or additional functionalities without departing from the invention.

The data collectors may generate and/or obtain telemetry data: (i) in response to a request from the system control processor (298) or the system control processor manager (e.g., 50, FIG. 1.1), periodically based on a telemetry schedule, and/or in real time. The telemetry data (318) may include, for example, performance metrics, log files, utilization information, and other and/or additional types of information associated with components of the composed information handling system without departing from the invention. Each telemetry data component (e.g., performance metric, log file, etc.) of the telemetry data (318) may be associated with a component identifier (e.g., a unique combination of bits associated with a hardware resource, compute resource, workload, service, etc.). The component identifier may specify which component of the composed information handling system the telemetry data component is associated. Each telemetry data component may further be associated with a data collector identifier (e.g., a unique combination of bits associated with a data collector) that may be used to identify the data collector that generated or obtained the telemetry data component. The component identifier and/or the data collector identifiers may be used to select telemetry data components of the telemetry data that satisfy telemetry intents.

The telemetry data (318) may be maintained in the storage (312) by the telemetry collection manager (320) of the system control processor (298). The telemetry collection manager (320) may obtain the telemetry data (318) from the data collectors, update telemetry data (318) stored in the storage (312), and remove telemetry data (318) from the storage (312), and/or provide copies of portions of telemetry data (318) to the system control processor manager (e.g., 50, FIG. 1.1) during the performance of local telemetry services associated with the composed information handling system. The telemetry collection manager (320) may store the telemetry data (318) in the storage (312). The system control processor (298) may provide the a portions (i.e., a portion of the telemetry data components) of the telemetry data (318) to the system control processor manager (50, FIG. 1.1) which may further provide the telemetry data components to users (e.g., system administrators, quality engineers, etc.) to for further processing and analysis. The telemetry data (318) may be used be used for other and/or additional purposes without departing from the invention.

The data structures of the telemetry data (318) may be implemented using, for example, lists, tables, unstructured data, databases, etc. While illustrated in FIG. 3 as being stored locally, the telemetry data (318) may be stored remotely and may be distributed across any number of devices without departing from the invention.

While illustrated in FIG. 3 as being stored locally on the storage (312) of the system control processor (298), the composed information handling system data (314), resource map (316), and the telemetry data (318) may be stored remotely and may be distributed across any number of devices including storage devices of the hardware resource set of the composed system without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
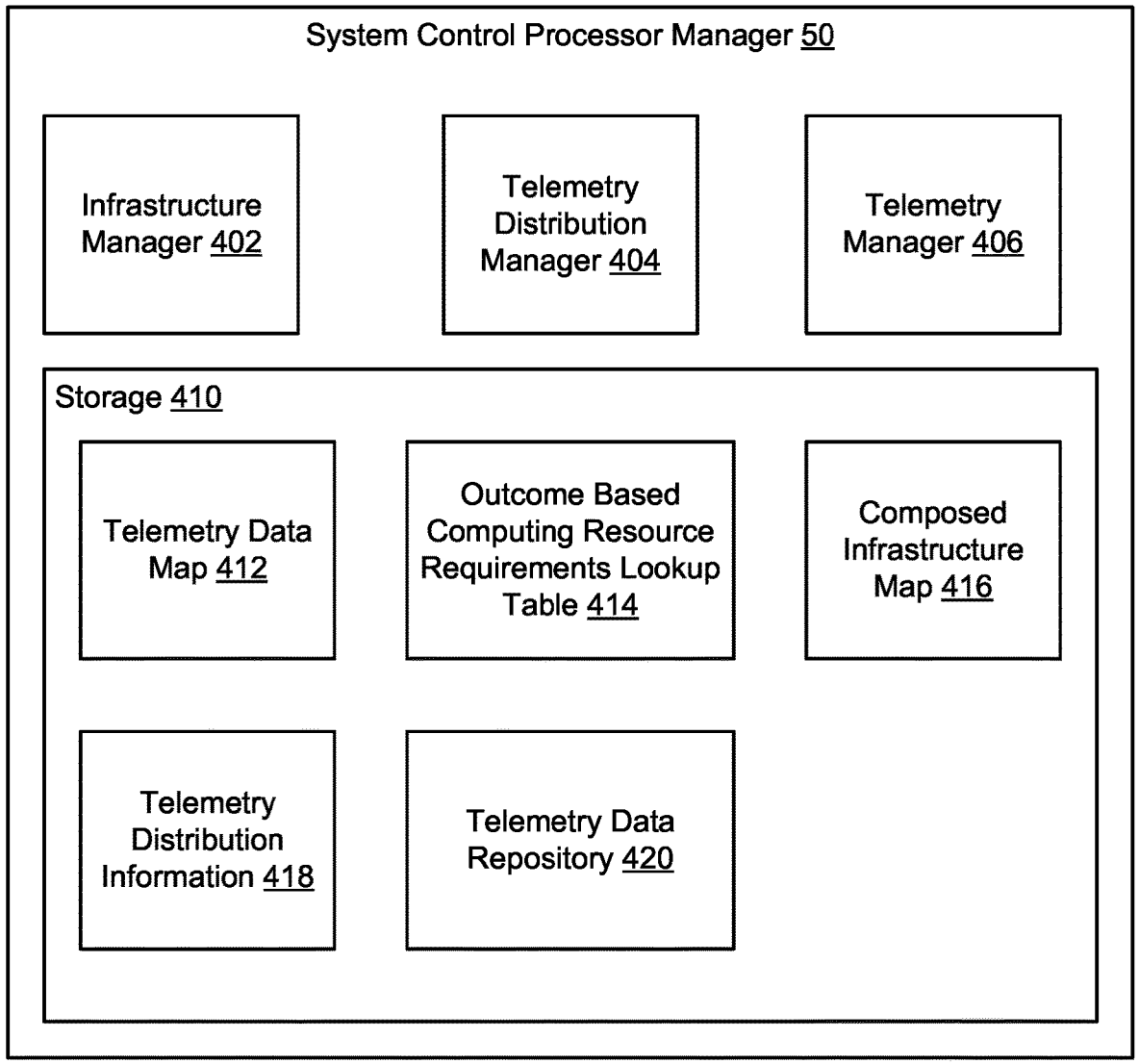
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems. To do so, the system control processor manager (50) may include an infrastructure manager (402), a telemetry distribution manager (404), a telemetry manager (406), and storage (410). Each of these components is discussed below.

The infrastructure manager (402) may provide composition services. Composition services may include obtaining composition requests for composed information handling systems, determining the resources to allocate to instantiate composed information handling systems, and cooperating with system control processors to allocate the identified resources. By doing so, the infrastructure manager (402) may cause any number of computer implemented services to be provided using the composed information handling systems.

To determine the resources to allocate to composed information handling systems, the infrastructure manager (402) may employ an intent based model that translates an intent expressed in a composition request to one more allocations of computing resources. For example, the infrastructure manager (402) may utilize an outcome based computing resource requirements lookup table (414) to match an expressed intent to resources to be allocated to satisfy that intent. The outcome based computing resource requirements lookup table (414) may specify the type, quantity, method of management, and/or other information regarding any number of computing resources that when aggregated will be able to satisfy a corresponding intent. The infrastructure manager (402) may identify resources for allocation to satisfy composition requests via other methods without departing from the invention.

To cooperate with the system control processors, the infrastructure manager (402) may obtain telemetry data regarding the computing resources of any number of information handling systems and/or external resources that are available for allocation. The infrastructure manager (402) may aggregate this data in a telemetry data repository (420) which may be subsequently used to identify resources of any number of information handling systems and/or external resources to satisfy composition requests (e.g., instantiate one or more composed information handling systems to meet the requirements of the composition requests).

When the infrastructure manager (402) identifies the computing resources to be allocated, the infrastructure manager (402) may communicate with any number of system control processors to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated, the infrastructure manager (402) may add information reflecting the resources allocated to composed information handling systems, the workloads being performed by the composed information handling systems, user identifiers (e.g., a unique combination of bits associated with a particular user) associated with one or more users using the composed information handling systems, and/or other types of information to a composed infrastructure map (416). The infrastructure manager (402) may utilize this information to, for example, decide whether computing resources should be added to or removed from composed information handling system. Consequently, computing resources may be dynamically re-provisioned over time to meet changing workloads imposed on composed information handling systems.

The system control processor manager (50) may fail and/or otherwise lose the telemetry data map (412) and the composed infrastructure map (416) for any reason without departing from the invention. To continue to provide composition services, the system control processor manager (50) may restore the telemetry data map (412) and the composed infrastructure map (416) by performing a discovery to obtain telemetry data from system control processors and obtaining state information associated with the composed systems from one or more system control processors. The system control processor manager (50) may use the telemetry data and the state information to repopulate the telemetry data map (412) and the composed infrastructure map (416) and to determine whether any composed information handling systems need to be re-composed.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIG. 5.1.

The telemetry distribution manager (404) may include the functionality to setup telemetry services. Setting up telemetry services may include: (i) obtaining requests to instantiate composed information handling systems from users, (ii) determining whether composition requests are associated with existing groups or new groups, (iii) determining whether composition requests associated with existing groups are further associated with a change to the existing group, (iv) modifying telemetry distribution information (e.g., 418) based on changes to existing groups, (v) generating new telemetry distribution information for new groups, (vi) instructing system control processors (e.g., 298) to instantiate data collectors, and (vii) associated data collectors with telemetry distribution information (418) and a telemetry data map (412). Setting up telemetry services may include other and/or additional services without departing from the invention. The telemetry distribution manager (404) may include the functionality to perform the method of FIG. 5.2. The telemetry distribution manager (404) may include other and/or additional functionalities without departing from the invention.

The telemetry distribution manager (404) may maintain telemetry distribution information (418). The telemetry distribution information (418) may be one or more data structures that include group entries. Each group entry may include a group identifier, one or more user identifiers, a group encryption key, communication information associated with users, a composed information handling system identifier, and data collector information. The telemetry distribution information (418) may include other and/or additional information without departing from the invention. The telemetry distribution information (418) may be generated and maintained by the telemetry distribution manager (404) when setting up telemetry services or when group modification requests (discussed below) are obtained. The telemetry distribution information (418) may be used by the telemetry manager (406) when performing telemetry services.

The group identifier may be a unique combination of bits used to identify a specific group of users. The user identifiers may be unique combinations of bits used to identify specific groups of users. The communication information may be any appropriate information that may be used to enable the communication of instructions and/or data between the system control processor manager (50) and the users without departing from the invention. The group encryption key may be an encryption key generated and distributed to the users of the group periodically, when a new user is added to the group, or when a user is removed from the group. The group encryption key may be used by the telemetry manager (406) to encrypt aggregated telemetry data and by the user to decrypt the aggregated telemetry data. The composed information handling system identifier may be a unique combination of bits associated with composed information handling system and may be used to specify the composed information handling system. The data collector information may include data collector identifiers associated with the data collectors of the composed information handling system, component identifiers associated with the data collectors, and telemetry data types (e.g., performance metrics, log files, utilization measures, etc.).

The telemetry distribution manager (404) may also maintain a telemetry data map (412). The telemetry data map (412), in addition to the discussion below, may also be one or more data structures that include telemetry intents and data collector information. The telemetry data map (412) may include a list of telemetry intents. Each telemetry intent may be mapped to one or more telemetry data types and composed information handling system component types (e.g., storage devices, compute devices, special purpose devices, workloads, services, etc.). Each telemetry data type and composed information handling system component type may be associated with data collector identifiers of data collectors of composed information handling systems that may generate the telemetry data type for the composed information handling system component type of the composed information handling system. The telemetry data map (412) may be used by the telemetry manager (406) to perform telemetry services. The telemetry distribution manager (404) may update telemetry maps when composed information handling systems are composed. Additionally, users (e.g., system administrators) may update the telemetry data map (412) to: (i) update telemetry intents, (ii) update mappings between telemetry intents and composed information handling system component types and telemetry data types, and/or (iii) update the telemetry data types and/or composed information handling component types. The telemetry manager (406) may use the telemetry data map (412) to perform telemetry services.

In one or more embodiments of the invention, the telemetry distribution manager (404) is implemented using a hardware device including circuitry. The hardware device may be, for example, a digital signal processor, a field programmable gate array, or an application specific integrated circuit. The circuitry may be adapted to cause the hardware device to perform the functionality of the telemetry distribution manager (404). The telemetry distribution manager (404) may be implemented using other types of hardware devices without departing from the invention.

In one or more embodiments of the invention, the telemetry distribution manager (404) is implemented using a processor adapted to execute computing code stored on a persistent storage that when executed by the processor performs the functionality of the telemetry distribution manager (404). The processor may be a hardware processor including circuitry such as, for example, a central processing unit or a microcontroller. The processor may be other types of hardware devices for processing digital information without departing from the invention.

When providing its functionality, the telemetry distribution manager (404) may perform all, or a portion, of the methods illustrated in FIGS. 5.1-5.2.

To perform telemetry services, the system control processor manager (50) may include a telemetry manager (406). Performing the telemetry services may include: (i) obtaining telemetry requests from users associated with groups, (ii) identifying a telemetry intent associated with the telemetry request, (iii) aggregate telemetry data obtained from system control processor and/or data collectors that satisfy the telemetry intent, (iv) encrypt the aggregated telemetry data using appropriate group encryption keys, and (v) providing the encrypted aggregated telemetry data the users of the group. The telemetry services may include other and/or additional services without departing from the invention. The telemetry manager (406) may include the functionality to perform, all or a portion of, the method of FIG. 5.3. The telemetry manager (406) may include other and/or additional functionalities without departing from the invention.

The telemetry manager (406) may further include the functionality to maintain a telemetry data repository (420). The telemetry data repository may be one or more data structures that include composed information handling system entries. A composed information handling system entry may include a composed information handling system identifier and telemetry data associated with the composed information handling system corresponding with the composed information handling system identifier obtained from system control processors and/or data collectors. The telemetry data may be an embodiment of the telemetry data (318) discussed above in FIG. 3. The telemetry data repository (420) may be updated by the telemetry manager (406) as telemetry services are performed for composed information handling systems. The telemetry data included in the telemetry data repository (420) may be the telemetry data necessary to satisfy telemetry intents during the performance of telemetry services. In other words, the telemetry data repository (420) may include telemetry data associated with an entire composed information handling system. The telemetry data repository (420) may be used by the telemetry manager (406) to perform telemetry services. The telemetry data repository may include other and/or additional information and may be used for other and/or additional purposes without departing from the invention.

In one or more embodiments of the invention, the telemetry manager (406) is implemented using a hardware device including circuitry. The hardware device may be, for example, a digital signal processor, a field programmable gate array, or an application specific integrated circuit. The circuitry may be adapted to cause the hardware device to perform the functionality of the telemetry manager (406). The telemetry manager (406) may be implemented using other types of hardware devices without departing from the invention.

In one or more embodiments of the invention, the telemetry manager (406) is implemented using a processor adapted to execute computing code stored on a persistent storage that when executed by the processor performs the functionality of the telemetry manager (406). The processor may be a hardware processor including circuitry such as, for example, a central processing unit or a microcontroller. The processor may be other types of hardware devices for processing digital information without departing from the invention.

When providing its functionality, the telemetry manager (406) may perform all, or a portion of, the methods illustrated in FIGS. 5.3.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412), outcome based computing resource requirements lookup table (414), the composed infrastructure map (416), the telemetry distribution information (418), and a telemetry data repository (420). These data structures may be maintained by, for example, the infrastructure manager (402), the telemetry distribution manager (404), and/or the telemetry manager (406). For example, the infrastructure manager (402), the telemetry distribution manager (404), and/or the telemetry manager (406) may add, remove, and/or modify information included in these data structures to cause the information included in these data structure to reflect the state of any number of information handling systems, external resources, and/or composed information handling systems and to perform telemetry services.

Any of these data structures may be implemented using, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIGS. 5.1-5.3 show methods that may be performed by components of the system of FIG. 1.1 to compose and manage composed information handling systems.

Turning to FIG. 5.1, FIG. 5.1 shows a flowchart of a method in accordance with one or more embodiments of the invention. The method depicted in FIG. 5.1 may be performed to instantiate a composed information handling system in accordance with one or more embodiments of the invention. The method shown in FIG. 5.1 may be performed by, for example, a system control processor manager (e.g., 50, FIG. 1.1). Other components of the system in FIG. 1.1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, a composition request for a composed information handling system is obtained. The composition request may be obtained using any method without departing from the invention. For example, the composition request may be obtained as part of a message from another entity operatively connected to a system control processor manager. In another example, the composition request may be locally stored in a storage of a system control processor manager.

The composition request may be a data structure specifying that the composed information handling system is to be instantiated. As discussed with respect to FIG. 3, the composition request may be specific (i.e., includes a listing of resources to be allocated to the composed information handling system) or intent based (i.e., a desired outcome without specifying the resources to be allocated). The composition request may include any type and quantity of information usable to determine how to instantiate a composed information handling system.

In one or more embodiments of the invention, the composition request includes a list of computing resources to be allocated to the composed information handling system. For example, the composition request may specify computing resources, memory resources, storage resources, graphics processing resources, compute acceleration resources, communications resources, etc. The list may include any type and quantity of computing resources. The list of computing resources may include computing resources to be used to provide data protection services.

In one or more embodiments of the invention, the composition request specifies how the computing resources are to be presented. For example, the composition request may specify virtualization, emulation, etc. for presenting the computing resources.

In one or more embodiments of the invention, the composition request specifies how the resources used to present the computing resources are to be managed (e.g., a management model such as data integrity, security, management, usability, performance, etc.). For example, the composition request may specify levels of redundancy for data storage, data integrity to be employed (e.g., redundant array of independent disks (RAID), error correction code (ECC), etc.), levels of security to be employed for resources (e.g., encryption), and/or other information that specifies how system control processors are to utilize resources for presentation of resources to composed information handling systems. The composition request may specify that telemetry services are to be provided to the computing resources of the composed information handling system. The data protection services may include performing deduplication and/or compression on data generated by applications executing in the composed information handling system.

The methods employed by the system control processors, or a portion thereof, may be transparent to the composed information handling systems because the resources may be presented to the compute resource sets of the composed information handling systems as bare metal resources while the system control processors provide the management functionality.

In one or more embodiments of the invention, the composition request includes a list of applications to be hosted by the composed information handling system. The list may include any type and quantity of applications.

The composition request may also specify the identities of one or more system control processors hosted by other devices. In some scenarios, as noted above, resources from other information handling systems may be used to form a composed information handling system. The identifiers of the system control processors of these other information handling systems may be used to form operable connections between the system control processors. These connections may be used by the system control processors to present, as bare metal resources, computing resources from other information handling systems to compute resource set(s) of the composed information handling system.

In one or more embodiments of the invention, the composition request specifies a desired outcome. The desired outcome may be, for example, computer implemented services to be provided in response to the composition request, telemetry services are to be provided in response to the composition request, etc. In another example, the desired outcome may be a list of applications to be hosted in response to the composition request. In other words, the composition request may specify a desired outcome without specifying the resources that are to be used to satisfy the requests, the methods of managing the resources, models employed to provide for data protection/integrity/security/ etc. Such a composition request may be referred to as an intent based composition request.

In step 502, at least one compute resource set having computing resources specified by the composition request is identified. The at least one compute resource set may be identified by matching the computing resources specified by the composition request to at least one compute resource set having those resources using a telemetry data map (412, FIG. 4).

For example, the telemetry data map (412, FIG. 4) may specify a list of compute resource sets, identifiers of control resource sets that manage the listed compute resource sets, the hardware devices of the listed compute resource sets, and characteristics and information regarding the compute resource set (e.g., memory size, storage size). By matching the computing resources specified by the composition request to the hardware devices specified in the list, the compute resource set corresponding to the listed hardware devices may be identified as the at least one compute resource set.

If no compute resource set includes all of the computing resources specified by the composition request, multiple compute resource sets having sufficient hardware devices to meet the computing resources specified by the composition request may be identified as the at least one compute resource set.

In step 504, at least one hardware resource set having hardware resources specified by the composition request is identified. The at least one hardware resource set may be identified similarly to that described with respect to the identified of the at least one compute resource set of step

502. For example, the computing resources requirements specified by the composition request may be matched to compute resource sets.

In step 506, telemetry services for the composed system are setup using at least one control resource set to obtain logical hardware resources managed by the at least one control resource set. The system control processor manager may instruct the at least one control resource set to perform local telemetry services. To perform local telemetry services, the system control processor manager may instantiate a telemetry collection manager (e.g., 320, FIG. 3) on the at least one control resource set. The system control processor manager may generate and/or obtain instructions and a device image for instantiating a telemetry collection manager to perform telemetry services for the composed information handling system. The system control processor manager may encapsulate the instructions and device image in messages, and send the messages to one or more system control processors of the at least one control resource set of the composed information handling systems. In response to receiving the message, the system control processors may implement the instructions thereby instantiating the telemetry collection manager using the device image. The telemetry collection manager may be instantiated on the composed information handling system using other methods (e.g., performing first-time installations, copying binaries to storage and beginning execution of the binaries, etc.) without departing from the invention.

Additional management services may also be set up. The additional management services may include, for example, virtualization, emulation, abstraction, indirection, duplicative writes, deduplication, compression, backup generation, and/or other type of services to meet the requirements of data integrity, security, and/or management models. The control resource set may provide at least a portion of the management services to the at least one hardware resource set identified in step 506. For additional information regarding setting up telemetry services for composed systems (i.e., also referred to as composed information handling systems herein), refer to FIG. 5.2.

In step 508, the logical hardware resources are presented to the at least one compute resource set as bare metal resources using the at least one control resource set to instantiate the composed information handling system to service the composition request.

To present the logical hardware resources, the system control processor manager may instruct the system control processors of the at least one control resource set to make the bare metal resources discoverable. For example, the at least one control resource set may send a bare metal communication to one or more processors of the at least one compute resource set to cause the processors to discover the presence of the presented bare metal resources. By doing so, the processors may then begin to utilize the logical hardware resources as bare metal resources resulting in a composed information handling system having all of the resources necessary to provide desired computer implemented services.

The method may end following step 508.

Using the method illustrated in FIG. 5.1, a composed information handling system may be formed using computing resources from one or more information handling systems and/or external resources.

Following step 508 of FIG. 5.1, no applications may be presently executing on the composed information handling system. The composed information handling systems may then be turned over to other entities for management (e.g., orchestrators, managers, and/or controllers) or may be additionally managed by the system control processor manager by instructing the system control processors to load applications onto the composed information handling systems using any method without departing from the invention. For example, device images (e.g., data structures including information that may be used to instantiate one or more applications in corresponding operating states) may be used to begin execution of appropriate applications in desired states. By doing so, the composed information handling systems may begin to provide desired computer implemented services. Applications may be instantiated on a composed information handling system using other methods (e.g., performing first-time installations, copying binaries to storage and beginning execution of the binaries, etc.) without departing from the invention.

Concurrently with or following the steps illustrated in FIG. 5.1, the composed information handling system data (314, FIG. 3) and resource map (316, FIG. 3) may be updated to reflect that various resources have now been allocated and are no longer available for allocation. For example, the resource map (316, FIG. 3) may be updated to indicate that the various hardware/virtualized devices being utilized to present bare metal resources to the composed information handling system are now allocated and unavailable (at least in part if virtualized) for allocation to present bare metal resources to other composed information handling systems. The resource maps maintained by the system control processor manager may be similarly updated.

Turning to FIG. 5.2, FIG. 5.2 shows a flowcharts of a method in accordance with one or more embodiments of the invention. The method of FIG. 5.2 may be performed to set up telemetry services in accordance with one or more embodiments of the invention. The method shown in FIG. 5.2 may be performed by, for example, a system control processor manager (e.g., 50, FIG. 1.1). Other components of the system in FIG. 1.1 may perform all, or a portion, of the methods of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 520, users associated with the composition request are identified. The composition request may include one or more user identifiers associated with users that submitted the composition request, users that may use the composed information handling system, users that may request telemetry data associated with the composed information handling system, and/or other users that may be otherwise associated with the composed information handling system without departing from the invention. The system control processor manager may parse the composition request to identify the one or more user identifiers included in the composition request. Additionally, the composition request may also include a group identifier. The system control processor manager may match the group identifier included in the composition request with a group identifier included in the telemetry distribution information. The system control processor manager may identify the user identifiers associated with the matching group identifier using the telemetry distribution information. Users associated with the composition request may be identified via other and/or additional methods without departing from the invention.

In step 522, a determination is made as to whether the composition request is associated with an existing group. In one or more embodiments of the invention, the system control processor uses the composition request and/or the telemetry distribution information to determine whether the composition request is associated with an existing group. As discussed above, the composition request may include a group identifier. The system control processor manager may compare the group identifier included in the composition request with the group identifiers included in the telemetry distribution information. In one or more embodiments of the invention, if the system control processor identifies a match between the group identifier in the composition request and a group identifier included in the telemetry distribution information, then the system control processor may determine that the composition request is associated with an existing group. In one or more embodiments of the invention, if the system control processor manager does not identify a match between the group identifier included in the composition request an a group identifier included in the telemetry distribution information, then the system control processor may determine that the composition request is not associated with an existing group. Additionally, in one or more embodiments of the invention, if the composition request does not include a group identifier, then the system control processor manager may determine that the composition request is not associated with an existing group. The determination may be made as to whether the composition request is associated with an existing group via other and/or additional methods without departing from the invention.

In one or more embodiments of the invention, if it is determined that the composition request is associated with an existing group, then the method proceeds to step 524. In one or more embodiments of the invention, if it is determined that the composition request is not associated with an existing group (i.e., composition request is associated with a new group), then the method proceeds to step 530.

In step 524, a determination is made as to whether the composition request is associated with a change in the group. In one or more embodiments of the invention, the system control processor manager uses the composition request to determine whether the composition request is associated with a change in the group. The composition request may further include a group modification request. The system control processor manager may parse the composition request to identify a group modification request. In one or more embodiments of the invention, if the system control processor manager identifies a group modification request in the composition request, then the system control processor manager may determine that the composition request is associated with a change to the group. In one or more embodiments of the invention, if the system control processor manager does not identify a group modification request in the composition request, then the system control processor manager may determine that the composition request is not associated with a change to the group.

Alternatively, if the composition request does not include a group modification request, the system control processor manager may compare the user identifiers included in the composition request with the user identifiers associated with the group identifier included in the telemetry distribution information. In one or more embodiments of the invention, if the user identifiers included in the composition request match the user identifiers associated with the group identifier included in the telemetry distribution information, then the system control processor manager determines that the composition request is not associated with a change to the group. In one or more embodiments of the invention, if the user identifiers included in the composition request do not match the user identifiers associated with the group identifier included in the telemetry distribution information, then the system control processor manager determines that the composition request is associated with a change to the group. The determination as to whether the composition request is associated with a change in the group may be via other and/or additional methods without departing from the invention.

In one or more embodiments of the invention, if it is determined that the composition request is associated with a change in the group, then the method proceeds to step 526. In one or more embodiments of the invention, if it is determined that the composition request is not associated with a change in the group, then the method proceeds to step 528.

In step 526, the telemetry distribution information is modified based on the change to the group. In one or more embodiments of the invention, the system control processor manager modifies the telemetry distribution information associated with the group based on the group modification request. The group modification request may specify whether one or more users are to be added and/or removed to/from the group. The group modification request may include the user identifiers associated with users to be added and/or removed. For users to be added, the group modification request may further include communication information (e.g., a network address) associated with those users.

In one or more embodiments of the invention, the system control processor manager modifies the telemetry distribution information associated with the group based on the user identifiers included in the composition request. If user identifiers are included in the composition request but not in the telemetry distribution information in the group entry, then the system control processor manager may add the users to the group. Similarly, if user identifiers are included in the group entry of the telemetry distribution information but not included in the composition request, then the system control processor manager may remove those users from the group entry of the telemetry distribution information. The composition request may further include communication information associated with users to be added to the group entry of the telemetry distribution information.

In one or more embodiments of the invention, to add users to the group, the system control processor manager updates the group entry of the telemetry distribution information associated with the group. The system control processor manager may include the user identifiers and communication information associated with the users in group entry. In one or more embodiments of the invention, to remove users from the group, the system control processor manager updates the group entry of the telemetry distribution information associated with the group. The system control processor may remove, overwrite, or otherwise delete user identifiers and communication information associated with removed users from the group entry of the telemetry distribution information.

In one or more embodiments of the invention, if a user is added to the group, the system control processor manager may provide the current group encryption key to the user using the communication information associated with the user. In one or more embodiments of the invention, if a user is removed from the group, the system control processor manager may generate a new group encryption key and provide the new group encryption key to the current users associated with the group using communication information corresponding to the current users. The new group encryption key may be generated using any appropriate encryption key generation algorithms (e.g., symmetric-key algorithms, public key algorithms, etc.) or combination thereof without departing from the invention. The group keys may be distributed to the users using any appropriate cryptographic protocols (e.g., Transport Layer Security (TLS)) without departing from the invention.

In one or more embodiments of the invention, the system control processor manager includes the composed information handling system identifier in the group entry of the telemetry distribution information. The telemetry distribution information may be modified based on the change to the group via other and/or additional methods without departing from the invention.

In step 528, data collectors are instantiated to collect telemetry data. The system control processor manager may generate and/or obtain instructions and a device image for instantiating one or more data collectors to generate, obtain, and/or maintain telemetry data associated with the composed information handling system. The system control processor manager may encapsulate the instructions and device image in messages, and send the messages to one or more system control processors of the at least one control resource set of the composed information handling systems. In response to receiving the message, the system control processors may implement the instructions thereby instantiating the data collectors using the device image. Data collectors may be instantiated on the composed information handling system using other methods (e.g., performing first-time installations, copying binaries to storage and beginning execution of the binaries, etc.) without departing from the invention.

For composition requests associated with a re-composition of previously generated composed information handling systems, the system control processor manager may: (i) instantiate additional data collectors, (ii) remove previously instantiated data collectors, and/or (iii) modify the operation of previously instantiated data collectors. A re-composition may refer to adding, removing, and/or modifying components to/from/of a previously generated composed information handling system. After instantiating the data collectors, the data collectors may begin to generate, obtain, and/or maintain telemetry data associated with the composed information handling system. The data collectors may also be instantiated to collect telemetry data via other and/or additional methods without departing from the invention.

In one or more embodiments of the invention, the method proceeds to step 534 following step 528.

In step 530, new telemetry group distribution information associated with the users and the composed information handling system is generated. In one or more embodiments of the invention, the system control processor manager generates new telemetry group distribution information by updating the telemetry group information to include a new group entry. The system control processor manager may include the user identifiers and the communication information included in the composition request in the new group entry. The system control processor manager may also include the group identifier included in the composition request in the new group entry. If the composition request did not include a group identifier, then the system control processor may generate a new group identifier and include the new group identifier in the new group entry. The system control processor manager may further include the composed handling system identifier in the new group entry.

The system control processor manager may also generate a new group encryption key and include the new group encryption key in the new group entry. The system control processor manager may provide the new group encryption key to the users associated with the group using communication information corresponding to the current users. The new group encryption key may be generated using any appropriate encryption key generation algorithms (e.g., symmetric-key algorithms, public key algorithms, etc.) or combination thereof without departing from the invention. The group keys may be distributed to the users using any appropriate cryptographic protocols (e.g., Transport Layer Security (TLS)) without departing from the invention. New telemetry group distribution information associated with the users and the composed information handling system may be generated via other and/or additional methods.

In Step 532, data collectors are instantiated to collect telemetry data. The system control processor manager may generate and/or obtain instructions and a device image for instantiating one or more data collectors to generate, obtain, and/or maintain telemetry data associated with the composed information handling system. The system control processor manager may encapsulate the instructions and device image in messages, and send the messages to one or more system control processors of the at least one control resource set of the composed information handling systems. In response to receiving the message, the system control processors may implement the instructions thereby instantiating the data collectors using the device image. Data collectors may be instantiated on the composed information handling system using other methods (e.g., performing first-time installations, copying binaries to storage and beginning execution of the binaries, etc.) without departing from the invention.

For composition requests associated with a re-composition of previously generated composed information handling systems, the system control processor manager may: (i) instantiate additional data collectors, (ii) remove previously instantiated data collectors, and/or (iii) modify the operation of previously instantiated data collectors. A re-composition may refer to adding, removing, and/or modifying components to/from/of a previously generated composed information handling system. After instantiating the data collectors, the data collectors may begin to generate, obtain, and/or maintain telemetry data associated with the composed information handling system. The data collectors may also be instantiated to collect telemetry data via other and/or additional methods without departing from the invention.

In step 534, the data collectors may be associated with the telemetry distribution information. In one or more embodiments of the invention, the system control processor includes data collector information associated with the data collectors in the group entry of the telemetry distribution information. Additionally, the system control processor manager may include the one or more system control processor identifiers of the composed information handling system in the group entry of the telemetry distribution information. The data collector information may include data collector identifiers associated with the data collectors and other and/or additional information associated with the data collectors (e.g., types of telemetry data collected, components of the composed information handling system associated with the data collectors, etc.) without departing from the invention. The system control processor manager may obtain data collector information from the system control processors. The system control processor manager may also update the telemetry data map based on the data collector information. As a result, the system control processor manager may use the group entry of the telemetry distribution information to request telemetry data from the data collectors. Data collectors may be associated with the telemetry distribution information via other and/or additional methods without departing from the invention.

In one or more embodiments of the invention, the method ends following step 534.

Using the method illustrated in FIG. 5.2, telemetry services may be set up for a composed information handling system. As a result, telemetry services for composed information handling systems may be securely and efficiently provided to a user and/or a group of users.

Turning to FIG. 5.3, FIG. 5.3 shows a flowcharts of a method in accordance with one or more embodiments of the invention. The method of FIG. 5.3 may be performed to perform telemetry services in accordance with one or more embodiments of the invention. The method shown in FIG. 5.3 may be performed by, for example, a system control processor manager (e.g., 50, FIG. 1.1). Other components of the system in FIG. 1.1 and FIG. 1.2 may perform all, or a portion, of the methods of FIG. 5.3 without departing from the invention.

While FIG. 5.3 is illustrated as a series of steps, any of the steps may be omitted, performed in a different order, additional steps may be included, and/or any or all of the steps may be performed in a parallel and/or partially overlapping manner without departing from the invention.

In step 540, a telemetry request associated with a composed information handling system is obtained from a user of a group. The telemetry request may be obtained using any method without departing from the invention. For example, the telemetry request may be obtained as part of a message from another entity operatively connected to a system control processor manager (e.g., a client operated by a user). In another example, the composition request may be locally stored in a storage of a system control processor manager by a user.

The telemetry request may be a data structure (e.g., a manifest) specifying that one or more telemetry services is to be performed. The telemetry request may include a user identifier associated with the user that submitted the telemetry request, a group identifier associated with the group of users that includes the user for which may receive the telemetry data, one or more target user identifiers, and/or a composed information handling system identifier associated with the composed information handling system for which the telemetry services are to be performed. The user identifiers may be used by the system control processor manager to identify the user that submitted the telemetry request. The telemetry request may further include a telemetry intent specifying the telemetry services to be performed. The telemetry request may include other and/or additional information usable to manage telemetry services for composed information handling systems without departing from the invention.

In step 542, a telemetry intent associated with the telemetry request is identified. As discussed above, the telemetry request may include a telemetry intent. The telemetry intent may specify a desired outcome associated with a portion of the composed information handling system without specifying particular actions to be taken and/or data to be collected. The portion of the composed information handling system specified by the telemetry intent may include, for example, one or more components of the composed information handling system, one or more workloads performed by the composed information handling system, one or more applications and/or services executing on the composed information handling systems, and/or additional portions of the composed information handling system without departing from the invention. The telemetry intent may further specify a telemetry schedule for specifying when to provide telemetry data to the user or group and one or more trigger events. Trigger events may refer to one or more events (e.g., exceeding of performance thresholds, component failures, etc.), that when such events occur, trigger the collection and transmission of telemetry data. The desired outcome may be, for example, provide telemetry data for all network devices, provide telemetry data collected in the past week of storage devices upon storage device failures, provide a performance update on an application executing on the composed information handling system, and/or other types of desired outcomes associated with telemetry without departing from the invention. In other words, the telemetry request may specify a desired outcome without specifying the resources that are to be used to satisfy the request and the methods for performing telemetry services to satisfy the desired outcomes to satisfy the desired outcome.

The system control processor manager may parse the telemetry request to identify the telemetry intent. The system control processor manager may include a list of telemetry intents and may compare the telemetry intent included in the telemetry request with the list of telemetry intents to identify the telemetry intent associated with the telemetry request. The telemetry intent associated with the telemetry request may be identified via other and/or additional methods without departing from the invention.

In step 544, telemetry data is aggregated based on the telemetry intent. As discussed above, the telemetry data map may include mappings between telemetry intents and telemetry data types and/or data collector information. The system control processor manager may use the telemetry data map to identify and/or obtain telemetry data of the telemetry data types from the telemetry data repository to satisfy the telemetry intent. The system control processor manager may also use the telemetry data map to request and obtain telemetry data of specified telemetry data types from the specified data collectors to satisfy the telemetry intent. After collecting all the telemetry data required to satisfy the telemetry intent, the system control processor manager may compose the telemetry data into a single collection of aggregated telemetry data that satisfies the telemetry intent. As a result, only the telemetry data required to satisfy the telemetry intent may be collected and included in the aggregated telemetry data.

In step 546, the aggregated telemetry data is encrypted based on telemetry distribution information associated with the group. As discussed above, the telemetry request may include the group identifier associated with the group of users that includes the user that submitted the telemetry request. The system control processor manager may identify the group entry of the telemetry distribution information associated with the group using the group identifier. The system control processor manager may identify the current group encryption key include in the group entry of the telemetry distribution information. The system control processor manager may encrypt the aggregated telemetry data using the current group encryption key and any appropriate method of encryption without departing from the invention. The aggregated telemetry data may be encrypted based on the telemetry distribution information associated with the group and the composed information handling system via other and/or additional methods without departing from the invention.

In step 548, the encrypted aggregated telemetry data is provided to the group. The system control processor manager may send the encrypted aggregated telemetry data to each user in the group as a stream, broadcast, or multicast using any appropriate method of transmitting the aggregated telemetry data once to multiple users. As a result, only users with the current group encryption key (i.e., users of the group) may decrypt the encrypted aggregated telemetry data and use the aggregated telemetry data for further processing and analysis (e.g., component failure predictions, health assessments, etc.). The encrypted aggregated telemetry data may be provided to the group via other and/or additional methods without departing from the invention.

In one or more embodiments of the invention, the system control process manager may repeat step 544, step 546, and step 548, one or more times based on a schedule included in the telemetry request to satisfy the telemetry intent provided by the user.

In one or more embodiments of the invention, the method ends following step 548.

Using the method illustrated in FIG. 5.3, telemetry services may be performed by one or more system control processor managers for composed information handling systems. As a result, a user may submit a telemetry data request with a telemetry intent. In response to obtaining the telemetry intent, the system control processor manager may collect and aggregate only the telemetry data of the composed information handling system that satisfies the telemetry intent. The system control processor may then encrypt the aggregated telemetry data and simultaneously provide the encrypted aggregated telemetry data to users of a group. Therefore, telemetry services may be efficiently and securely provided to users of composed information handling systems.

Figure 6:
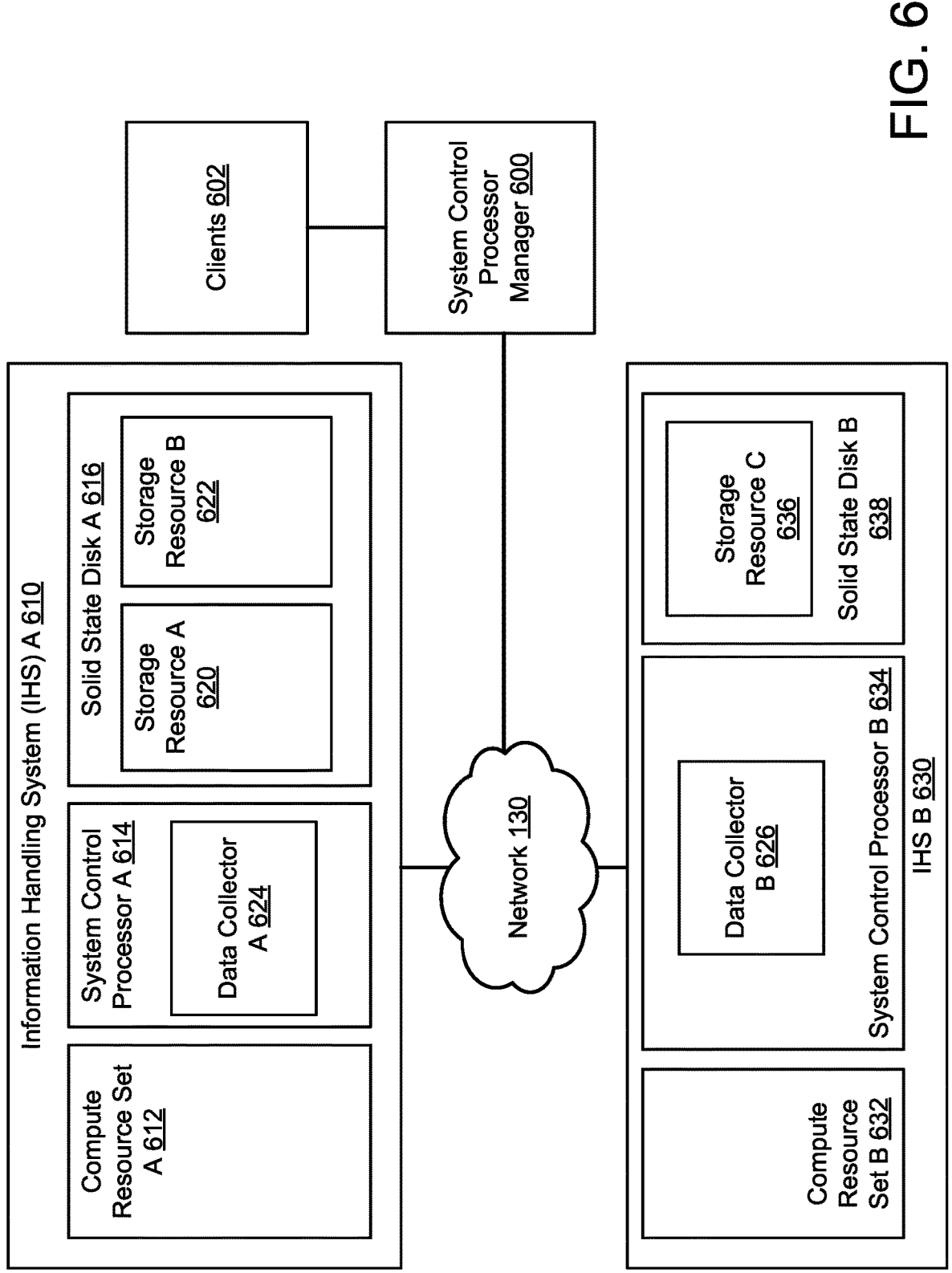
FIG. 6 show a diagram of an example system in accordance with one or more embodiments of the invention.

To further clarify embodiments of the invention, a non-limiting example is provided in FIG. 6. FIG. 6 shows a system similar to that illustrated in FIG. 1.1. Actions performed by components of the illustrated system are illustrated by numbered, circular boxes interconnected, in part, using dashed lines. For the sake of brevity, only a limited number of components of the system of FIG. 1.1 are illustrated in FIG. 6.

EXAMPLE

Consider a scenario as illustrated in FIG. 6.1 in which an employee of a company with five other employees submits, through a client of the clients (602), a composition request to instantiate a composed information handling system to host a database application. The composition request further specifies that telemetry services are to be provided for the composed information handling system. The composition request includes the user identifiers associated with all six employees of the company. The composition request may be submitted to the system control processor manager (600).

In response to obtaining the composition request, the system control processor manager (600) identifies the resources necessary to instantiate a composed information handling system to host the database application. The resources include compute resource set A (612), system control processor A (614), and two terabytes of solid state disk A (616) of IHS A (610), and system control processor B (634) and one terabyte of solid state disk B (638) of IHS B (630). The system control processor manager may then instruct system control processor A (614) and system control processor B (632) to instantiate the composed information handling system using the identified resources. As a result, system control processor A (614) generates storage resource A (620) by virtualizing a first portion including one terabyte of solid state disk A (616) and storage resource B (622) by virtualizing second portion of solid state disk A (616) including one terabyte. Similarly, system control processor B (634) generates storage resource C (636) by virtualizing a portion of solid state disk B (638) including one terabyte.

The system control processor manager (600) then determines, using the composition request and the telemetry distribution information, that the composition request is not associated with an existing group as the composition request does not include a group identifier and the user identifiers are not included in the telemetry distribution information. Based on the determination, the system control processor manager (600) generates new group telemetry distribution information by generating a new group entry. The new group entry includes a new group identifier associated with the group and include the user identifiers and the communication information of the six employees of the company. The system control processor manager (600) then instructs system control processor A (614) to instantiate data collector A (624) to generate, obtain, and/or maintain telemetry data for compute resource set A (612), system control processor A (624), storage resource A (620), storage resource B (622) and solid state disk A (616) of IHS A (610). The system control processor manager (600) then instructs system control processor B (634) to instantiate data collector B (626) to generate, obtain, and/or maintain telemetry data for system control processor A (624), storage resource C (636), and solid state disk B (638) of IHS B (630).

The system control processor manager (600) updates the group entry with the composed information handling system identifier and data collector information associated with the data collectors (624, 626). The system control processor manager (600) also updates the telemetry data map based on the data collector information. The system control processor manager (600) then instructs system control processor A (614) to instantiate the database application on compute resource set A (612) and the composed information handling system begins providing database services for the employees of the company to service the composition request.

At some point in time after the composed information handling system was instantiated, an employee of the company desires to know the health of the storage devices of the composed information handling system. Therefore, the employee submits, on behalf of the other employees of the company, a telemetry request to the system control processor manager (600) through a client of the clients (602). In response to obtaining the telemetry request, the system control processor manager (600) identifies that the telemetry intent associated with the telemetry request is to provide an update of the health of the storage devices of the composed information handling system. The system control processor manager (600) uses the telemetry data map and the telemetry distribution information to send requests to data collector A (614) and data collector B (626) for telemetry data associated with solid state disk A (616) and solid state disk B (638) respectively. The data collectors (624, 626) then collect the requested telemetry data associated with the solid state disks (616, 638) and provide the telemetry data to the system control processor manager (600). The telemetry data includes, for example, storage utilization, number of operations per second performed, device temperatures, number of reallocated sectors, number of read/write errors, number of command timeouts, and other information regarding the performance and health of the solid state disks (616, 638).

After collecting the necessary telemetry data to satisfy the telemetry intent of the telemetry request, the system control processor manager (600) composes the telemetry data into a single collection of aggregated telemetry data that provides a comprehensive view of the health of the solid state disks (616, 638). The system control processor then uses the current group encryption key associated with the employees of the company to encrypt the aggregated telemetry data. The system control processor then broadcasts the encrypted aggregated telemetry data to each client of the clients (602) associated with each of the six employees of the company. The employees may use their corresponding group encryption key to decrypt the encrypted aggregated telemetry data to assess the health of the solid state disks of the composed information handling system using the aggregated telemetry data.

End of Example

Thus, as illustrated in FIG. 6, embodiments of the invention may provide a system that enables the efficient secure performance of telemetry services of composed information handling systems.

Figure 7:
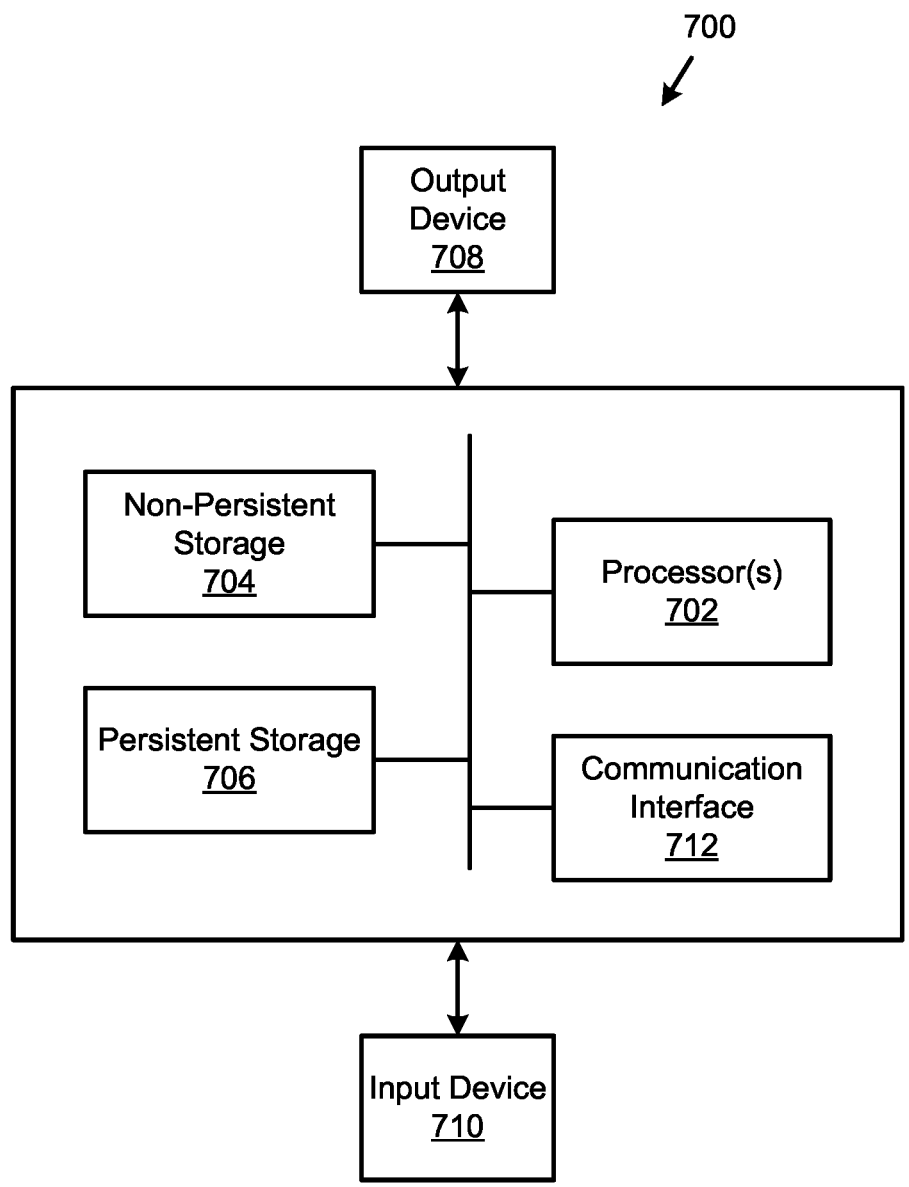
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for performing telemetry services for composed information handling systems. Specifically, embodiments of the invention may enable users associated with a group to submit composition requests associated with telemetry services, provide a system control processor manager that may compose an compose information handling system to with telemetry service capabilities, and generate telemetry distribution information associated with the group including a group encryption key which may be provided to all users included in the group. As a result, a user of the group may submit a telemetry request to the system control processor manager. The system control processor manager may aggregate telemetry data from data collectors and/or system control processors of the composed information handling system to satisfy the telemetry intent, encrypt the aggregated telemetry data with the group encryption key, and broadcast the encrypted aggregated telemetry data to all users of the group for further processing and analysis of the aggregated telemetry data. Consequently, the efficiency and security of generating and providing telemetry data to users of groups may be improved.

Thus, embodiments of the invention may address the problem of the inefficient use of composed information handling system to perform telemetry services.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for performing telemetry services for composed information handling systems, comprising:
    setting up, by a system control processor manager, telemetry services for at least one hardware resources set and at least one compute resource set, wherein setting up the telemetry services comprises:
        identifying users associated with a composition request, wherein the users comprise the user;
        making a determination that the composition request is not associated with an existing group; and
        in response to the determination:
            generating new group telemetry distribution information associated with the users and the composed information handling system;
            instantiating data collectors to generate telemetry data for the composed information handling system; and
            associating the data collectors with the new group telemetry distribution information;
    instantiating a composed information handling system using at least one control resource set, the at least one hardware resource set, and the at least one compute resource set;
    obtaining a telemetry request associated with the composed information handling system from the user;
    in response to obtaining the telemetry request:
        identifying a telemetry intent associated with the telemetry request;
        aggregating the telemetry data based on the telemetry intent to obtain aggregated telemetry data;

encrypting the aggregated telemetry data based on telemetry distribution information associated with the group to obtain encrypted aggregated telemetry data; and providing the encrypted aggregated telemetry data to the group.

2. The method of claim 1, wherein aggregating telemetry data based on the telemetry intent comprises identifying a portion of the telemetry data associated with the composed information handling system that satisfies to the telemetry intent.

3. The method of claim 2, wherein the aggregated telemetry data comprises the portion of the telemetry data.

4. The method of claim 1, wherein the telemetry distribution information comprises:
a group identifier associated with the composed information handling system;
user identifiers associated with the group identifier; and
encryption keys associated with the group identifier,
wherein the group is identified using the group identifier.

5. The method of claim 4, wherein encrypting the aggregated telemetry data based on the telemetry distribution information associated with the user and the composed information handling system comprises:
identifying the group identifier associated with the group; and
encrypting the aggregated telemetry data using the encryption keys associated with the group identifier.

6. The method of claim 1, further comprising:
prior to setting up the telemetry services:
obtaining the composition request for a composed information handling system;
in response to obtaining the composition request:
identifying the at least one compute resource set having compute resources specified by the composition request; and
identifying the at least one hardware resource set having hardware resources specified by the composition request.

7. A non-transitory computer readable medium comprising computer readable program code, which when executed by a computer processor enables the computer processor to perform a method for performing telemetry services for composed information handling systems, the method comprising:
setting up, by a system control processor manager, telemetry services for at least one hardware resources set and at least one compute resource set, wherein setting up the telemetry services comprises:
identifying users associated with a composition request, wherein the users comprise the user;
making a determination that the composition request is not associated with an existing group; and
in response to the determination:
generating new group telemetry distribution information associated with the users and the composed information handling system;
instantiating data collectors to generate telemetry data for the composed information handling system; and
associating the data collectors with the new group telemetry distribution information;
instantiating a composed information handling system using at least one control resource set, the at least one hardware resource set, and the at least one compute resource set;

obtaining a telemetry request associated with the composed information handling system from the user;
in response to obtaining the telemetry request:
identifying a telemetry intent associated with the telemetry request;
aggregating the telemetry data based on the telemetry intent to obtain aggregated telemetry data;
encrypting the aggregated telemetry data based on telemetry distribution information associated with the group to obtain encrypted aggregated telemetry data; and
providing the encrypted aggregated telemetry data to the group.

8. The non-transitory computer readable medium of claim 7, wherein aggregating telemetry data based on the telemetry intent comprises identifying a portion of the telemetry data associated with the composed information handling system that satisfies to the telemetry intent.

9. The non-transitory computer readable medium of claim 8, wherein the aggregated telemetry data comprises the portion of the telemetry data.

10. The non-transitory computer readable medium of claim 7, wherein the telemetry distribution information comprises:
a group identifier associated with the composed information handling system;
user identifiers associated with the group identifier; and
encryption keys associated with the group identifier,
wherein the group is identified using the group identifier.

11. The non-transitory computer readable medium of claim 10, wherein encrypting the aggregated telemetry data based on the telemetry distribution information associated with the user and the composed information handling system comprises:
identifying the group identifier associated with the group; and
encrypting the aggregated telemetry data using the encryption keys associated with the group identifier.

12. The non-transitory computer readable medium of claim 7, wherein the method further comprises:
prior to setting up the telemetry services:
obtaining the composition request for a composed information handling system;
in response to obtaining the composition request:
identifying the at least one compute resource set having compute resources specified by the composition request; and
identifying the at least one hardware resource set having hardware resources specified by the composition request.

13. A system for performing telemetry services for composed information handling systems, comprising:
a plurality of composed information handling systems, wherein the plurality of composed information handling systems comprise a plurality of system control processors; and
a system control processor manager, comprising a processor and memory, programmed to:
set up telemetry services for at least one hardware resources set and at least one compute resource set, wherein setting up the telemetry services comprises:
identify users associated with a composition request, wherein the users comprise the user;
make a determination that the composition request is not associated with an existing group; and
in response to the determination:

generate new group telemetry distribution information associated with the users and the composed information handling system;

instantiate data collectors to generate telemetry data for the composed information handling system; and associate the data collectors with the new group telemetry distribution information;

instantiate a composed information handling system using at least one control resource set, the at least one hardware resource set, and the at least one compute resource set;

obtain a telemetry request associated with the composed information handling system from the user associated with a group;

in response to obtaining the telemetry request:
identify a telemetry intent associated with the telemetry request;

aggregate the telemetry data based on the telemetry intent to obtain aggregated telemetry data;

encrypt the aggregated telemetry data based on telemetry distribution information associated with the group to obtain encrypted aggregated telemetry data; and provide the encrypted aggregated telemetry data to the group.

14. The system of claim 13, wherein aggregating telemetry data based on the telemetry intent comprises identifying a portion of the telemetry data associated with the composed information handling system that satisfies to the telemetry intent.

15. The system of claim 14, wherein the aggregated telemetry data comprises the portion of the telemetry data.

16. The system of claim 13, wherein the telemetry distribution information comprises:

a group identifier associated with the composed information handling system;

user identifiers associated with the group identifier; and encryption keys associated with the group identifier, wherein the group is identified using the group identifier.

17. The system of claim 16, wherein encrypting the aggregated telemetry data based on the telemetry distribution information associated with the user and the composed information handling system comprises:

identifying the group identifier associated with the group; and encrypting the aggregated telemetry data using the encryption keys associated with the group identifier.

18. The system of claim 13, wherein the system control processor manager is further programmed to:

prior to setting up the telemetry services:
obtain the composition request for a composed information handling system;

in response to obtaining the composition request:
identify the at least one compute resource set having compute resources specified by the composition request; and identify the at least one hardware resource set having hardware resources specified by the composition request.

* * * * *